US012727011B2

(12) United States Patent
Ye et al.

(10) Patent No.: US 12,727,011 B2
(45) Date of Patent: Sep. 1, 2026

(54) RESOURCE ALLOCATION ENHANCEMENT FOR SIDELINK

(71) Applicant: Apple Inc., Cupertino, CA (US)

(72) Inventors: Chunxuan Ye, San Diego, CA (US); Dawei Zhang, Saratoga, CA (US); Hong He, San Jose, CA (US); Huaning Niu, San Jose, CA (US); Jie Cui, San Jose, CA (US); Wei Zeng, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/614,535

(22) Filed: Mar. 22, 2024

(65) Prior Publication Data

US 2024/0340934 A1 Oct. 10, 2024

Related U.S. Application Data

(60) Provisional application No. 63/457,980, filed on Apr. 7, 2023.

(51) Int. Cl.
*H04W 72/40* (2023.01)
*H04L 5/00* (2006.01)
*H04W 72/02* (2009.01)
*H04W 72/25* (2023.01)

(52) U.S. Cl.
CPC ........... *H04W 72/40* (2023.01); *H04L 5/0044* (2013.01); *H04L 5/0053* (2013.01); *H04W 72/02* (2013.01); *H04W 72/25* (2023.01)

(58) Field of Classification Search
CPC ... H04L 5/0044; H04L 5/0053; H04L 5/0091; H04L 5/0094; H04W 72/02; H04W 72/25; H04W 72/40
See application file for complete search history.

(56) References Cited

U.S. PATENT DOCUMENTS

2022/0124694 A1 4/2022 Hong et al.
2022/0369287 A1* 11/2022 Abotabl .............. H04W 72/563
2023/0269730 A1* 8/2023 Sun ....................... H04L 5/0053 370/329
2024/0163904 A1* 5/2024 Huang .................. H04W 72/02
2024/0334395 A1* 10/2024 Hui ....................... H04W 72/02
(Continued)

FOREIGN PATENT DOCUMENTS

WO WO 2022/073183 4/2022

OTHER PUBLICATIONS

Nokia, "On Physical Channel Design Framework for SL-U," 3GPP TSG RAN WG1 #112, R1-2300037, Athens, Greece, Feb. 27-Mar. 3, 2023, 21 pages. (Year: 2023).*
(Continued)

*Primary Examiner* — Pao Sinkantarakorn
(74) *Attorney, Agent, or Firm* — Fish & Richardson P.C.

(57) ABSTRACT

Disclosed are methods, systems, and computer-readable medium to perform operations for resource allocation for contiguous resource block transmission. In one aspect, the operations can include actions of identifying a set of sub-channels that are not suitable for serving as leading sub-channels for Physical Sidelink Control Channel (PSCCH) and Physical Sidelink Shared Channel (PSSCH) transmission, and excluding the identified set of sub-channels from a candidate set of resources.

20 Claims, 15 Drawing Sheets

(56) References Cited

U.S. PATENT DOCUMENTS

| | | | | |
|---|---|---|---|---|
| 2025/0089077 | A1 | 3/2025 | Ye et al. | |
| 2025/0247884 | A1* | 7/2025 | Kusashima | H04W 74/0808 |

OTHER PUBLICATIONS

Nokia, âOn Physical Channel Design Framework for SL-U, â 3GPP TSG RAN WG1 #112, R1-2300037, Athens, Greece, Feb. 27-Mar. 3, 2023, 21 pages. (Year: 2023).*

LG Electronics, "Discussion on physical channel design framework for sidelink on unlicensed spectrum," 3GPP Tsg Ran WG1 #112, R1-2301533, Athens, Greece, February 27-Mar. 3, 2023, 36 pages.

* cited by examiner

RESOURCE ALLOCATION ENHANCEMENT FOR SIDELINK

CROSS-REFERENCE TO RELATED APPLICATION

This application claims priority to U.S. Provisional Patent Application No. 63/457,980, filed Apr. 7, 2023, the entire contents of which is incorporated herein by reference.

BACKGROUND

Wireless communication networks provide integrated communication platforms and telecommunication services to wireless user devices. Example telecommunication services include telephony, data (e.g., voice, audio, and/or video data), messaging, and/or other services. The wireless communication networks have wireless access nodes that exchange wireless signals with the wireless user devices using wireless network protocols, such as protocols described in various telecommunication standards promulgated by the Third Generation Partnership Project (3GPP). Example wireless communication networks include time division multiple access (TDMA) networks, frequency-division multiple access (FDMA) networks, orthogonal frequency-division multiple access (OFDMA) networks, Long Term Evolution (LTE), and Fifth Generation New Radio (5G NR). The wireless communication networks facilitate mobile broadband service using technologies such as OFDM, multiple input multiple output (MIMO), advanced channel coding, massive MIMO, beamforming, and/or other features.

SUMMARY

According to one innovative aspect of the present disclosure, a method for resource allocation for contiguous resource block transmission is disclosed. In one aspect, the method can include actions of identifying a set of sub-channels that are not suitable for serving as leading sub-channels for Physical Sidelink Control Channel (PSCCH) and Physical Sidelink Shared Channel (PSSCH) transmission, and excluding the identified set of sub-channels from a candidate set of resources.

Other aspects includes apparatuses, systems, and computer programs for performing the actions of the aforementioned method.

The innovative method can include other optional features. For example, in some implementations, identifying a set of sub-channels that are not suitable for serving as leading sub-channels for PSCCH/PSSCH transmission can include identifying a set of sub-channels that each have an overlap with a guard band.

In some implementations, identifying a set of sub-channels that are not suitable for serving as leading sub-channels for PSCCH/PSSCH transmission can include identifying a set of sub-channels that each have a predetermined number of first resource blocks that overlap with a guard band.

In some implementations, excluding the identified set of sub-channels from a candidate set of resources can include excluding the candidate set of resources is an initial candidate set of resources.

In some implementations, excluding the identified set of sub-channels from a candidate set of resources can include excluding the sub-channels from a total number of candidate resources $M_{TOTAL}$ in step 210 of FIG. 2.

In some implementations, excluding the identified set of sub-channels from a candidate set of resources can include excluding the identified set of sub-channels from a subsequent candidate set of resources that is evaluated for resource exclusion after an initial candidate set of resources is evaluated for resource exclusion.

In some implementations, excluding the identified set of sub-channels from a candidate set of resources can include excluding the identified set of sub-channels after step 210 of FIG. 2.

In some implementations, excluding the identified set of sub-channels from a candidate set of resources can include excluding the identified set of sub-channels after step 210 of FIG. 2 and before Step 260 of FIG. 2.

In some implementations, excluding the identified set of sub-channels from a candidate set of resources can include excluding the identified set of sub-channels after Step 260 of FIG. 2.

In some implementations, step 270 of FIG. 2 is based on X times a total number or resource ($M_{TOTAL}$), wherein $S_A$ already excludes the identified set of sub-channels.

In some implementations, X is separately (pre) configured for the operations of the contiguous resource block transmission in sidelink on unlicensed spectrum (SL-U).

In some implementations, step 270 of FIG. 2 is based on X times a total number or resource ($M_{TOTAL}$), wherein $S_A$ does not exclude the identified set of sub-channels.

In some implementations, X is separately (pre) configured for the operations of the contiguous resource block transmission in sidelink on unlicensed spectrum (SL-U).

In some implementations, X is less than 0.20.

According to another innovative aspect of the present disclosure, a method for resource allocation for interlaced resource block transmission is disclosed. In one aspect, the method can include actions of receiving a request for sidelink resources from another UE, and allocating a candidate single-slot resource for transmission, wherein the allocated candidate single-slot resource is defined as a set of correlated sub-channels in a particular logic slot.

Other aspects includes apparatuses, systems, and computer programs for performing the actions of the aforementioned method.

The innovative method can include other optional features. For example, in some implementations, the allocated single-slot resource can include contiguous sub-channels in a same resource block set.

In some implementations, the allocated single-slot resource can include a sub-channel with same index over contiguous resource block sets.

In some implementations, the allocated single-slot resource can include a contiguous sub-channels with same indices over contiguous resource block sets.

According to another innovative aspect of the present disclosure, a method for Physical Sidelink Feedback Channel (PSFCH) transmission occasion indications is disclosed. In one aspect, the method can include actions of obtaining resource pool (pre) configuration data indicating that (i) dynamic PSFCH occasion indication is supported or (ii) dynamic PSFCH occasion indication is not supported, and transmitting PSFCH transmission occasion indications based on the obtained resource pool (pre) configuration data.

Other aspects includes apparatuses, systems, and computer programs for performing the actions of the aforementioned method.

The innovative method can include other optional features. For example, in some implementations, the obtained resource pool (pre) configuration data indicates that dynamic PSFCH occasion indication is supported. In such implementations, transmitting PSFCH transmission occasion indications based on the obtained resource pool (pre) configuration data can include transmitting SCI of a PSCCH/PSSCH transmission, wherein the SCI of the PSCCH/PSSCH transmission indicates the PSFCH transmission occasions that are to be applied.

In some implementations, the one or more SCI of the PSCCH/PSSCH transmission are SCI stage 1 of the PSCCH/PSSCH transmission.

In some implementations, the one or more SCI of the PSCCH/PSSCH transmission are SCI stage 2 of the PSCCH/PSSCH transmission.

In some implementations, the obtained resource pool (pre) configuration data indicates that dynamic PSFCH occasion indication is supported. In such implementations, transmitting PSFCH transmission occasion indications based on the obtained resource pool (pre) configuration data can include transmitting a number of bits indicating which PSFCH transmission occasions are to be applied.

In some implementations, transmitting a number of bits indicating which PSFCH transmission occasions are to be applied can include transmitting a bitmap having a number of bits that indicate which PSFCH transmission occasion that are to be applied, wherein each bit of the bitmap corresponds to a particular PSFCH transmission occasion, with the number of bits of the bitmap corresponds to a number of (pre) configured PSFCH transmission occasions.

In some implementations, each bit of the bitmap is a 1 or a 0, with a 1 indicating that the corresponding PSFCH transmission occasion is to be applied and a 0 indicating that the corresponding PSFCH transmission occasion is not to be applied.

In some implementations, the bitmap is transmitted using SCI stage 1 of PSCCH/PSSCH transmission.

In some implementations, the bitmap is transmitted using SCI stage 2 of PSCCH/PSSCH transmission.

In some implementations, transmitting a number of bits indicating which PSFCH transmission occasions are to be applied can include transmitting a $\lceil \log_2 X \rceil$ bits to indicate the earliest PSFCH transmission occasions that are to be applied, where X is a (pre) configured number of PSFCH transmission occasions.

In some implementations, each of the PSFCH transmission occasions after the earliest indicated PSFCH transmission are autonomously applied.

In some implementations, the transmitted bits are transmitted using SCI stage 1 of PSCCH/PSSCH transmission.

In some implementations, the transmitted bits are transmitted using SCI stage 2 of PSCCH/PSSCH transmission.

According to another innovative aspect of the present disclosure, a method for resource allocation for co-eFIGstence with LTE sidelink is disclose. In one aspect, the method can include actions of determining a resource selection window that identifies an initial set of candidate two-slot resources, the resource selection window starting at a first slot ($t'_y$) and ending at another slot ($t'_{y+1}$), determining a first subset of candidate two-slot resources in the resource selection window by excluding, from the initial set of candidate two-slot resources, candidate two-slot resources over all sub-channels from the initial set if the UE has not monitored at least one of the two slots, extending the unmonitored slot to either $t'_y$ or $t'_{y+1}$ for any permissible periodicity value and a hypothetical SCI set, determining a second subset of candidate two-slot resources by excluding, from the first subset of candidate two-slot resources any single-slot resources that have been reserved by another UE, and reporting the second subset of candidate two-slot resources to a higher layer.

Other aspects includes apparatuses, systems, and computer programs for performing the actions of the aforementioned method.

The innovative method can include other optional features. For example, in some implementations, determining a resource selection window that identifies an initial set of candidate two-slot resources, the resource selection window starting at a first slot ($t'_y$) and ending at another slot ($t'_{y+1}$) occurs in step 210 of FIG. 2.

In some implementations, excluding, from the initial set of candidate two-slot resources, candidate two-slot resources over all sub-channels from the initial set if the UE has not monitored at least one of the two slots occurs in step 250 of FIG. 2.

In some implementation, excluding, from the initial set of candidate two-slot resources any single-slot resources that have been reserved by another UE occurs in step 260 of FIG. 2.

In some implementations, determining a resource selection window that identifies an initial set of candidate two-slot resources, the resource selection window starting at a first slot ($t'_y$) and ending at another slot ($t'_{y+1}$) can include determining whether the first slot ($t'_y$) of the resource selection window is not aligned with the starting position of a subframe in LTE sidelink. In such implementations, based on a determination that the first slot ($t'_y$) is not aligned with the starting position of the a subframe in LTE sidelink, the method can further include delaying the resource selection window to align with a starting position of a subframe in LTE sidelink.

In some implementations, determining a resource selection window that identifies an initial set of candidate two-slot resources, the resource selection window starting at a first slot ($t'_y$) and ending at another slot ($t'_{y+1}$) can include determining whether the last slot ($t'_{y+1}$) of the resource selection window is not aligned with an ending position of a subframe in LTE sidelink. In such implementations, based on a determination that the last slot ($t'_{y+1}$) of the resource selection window is not aligned with an ending position of a subframe in LTE sidelink, the method can further include prolonging or shortening the resource selection window to an ending position of a subframe in LTE sidelink.

In some implementations, the slots are logic slots or physical slots.

In some implementations, the operations can further include identifying a set of slots ($E_x$) that are not aligned with a starting of a subframe in LTE sidelink, and excluding the identified set of slots ($E_x$) from the initial set of candidate resources.

In some implementations, the operations can further include determining that another LTE UE has reserved an LTE sidelink resource in a subframe in LTE sidelink. In such implementations, based on the determination that the other LTE UE has reserved an LTE sidelink resource in a subframe in LTE sidelink, the method can further include excluding, from the second subset of candidate two-slot resources, each of the single-slot resources that are time overlapping a second half of the subframe.

In some implementations, the method can further include determining that another LTE UE reserves an LTE sidelink resource in a subframe that time overlaps with a first slot and a second slot.

In some implementations, the method can further include determining that a first resource associated with the first slot is in the second subset of candidate two-slot resources and a second resource associated with the second slot is not in the second subset of candidate two-slot resources. Then, based on a determination that a first resource associated with the first slot is in the second subset of candidate two-slot resources and a second resource associated with the second slot is not in the second subset of candidate two-slot resources, the method can further include excluding the first resource from the second subset of candidate two-slot resources.

In some implementations, the method can further include determining that a first resource associated with the first slot is not in the second subset of candidate two-slot resources and a second resource associated with the second slot is in the second subset of candidate two-slot resources. In such implementations, based on a determination that a first resource associated with the first slot is not in the second subset of candidate two-slot resources and a second resource associated with the second slot is in the second subset of candidate two-slot resources, the method can further include excluding the second resource from the second subset of candidate two-slot resources.

In some implementations, the method can further include determining that a first resource associated with the first slot is in the second subset of candidate two-slot resources and a second resource associated with the second slot is in the second subset of candidate two-slot resources. Then, based on a determination that a first resource associated with the first slot is in the second subset of candidate two-slot resources and a second resource associated with the second slot is in the second subset of candidate two-slot resources, the method can further include combining the first resource and the second resource in the second subset of candidate two-slot resources.

According to another innovative aspect of the present disclosure, a method for allocating residual physical resource blocks (PRBs) in a resource pool is disclosed. In one aspect, the method can include actions of receiving a request for sidelink resources from another UE, and allocating a resource pool of contiguous resource blocks for transmission to the other UE that includes the residual PRBs.

Other aspects includes apparatuses, systems, and computer programs for performing the actions of the aforementioned method.

The innovative method can include other optional features. For example, in some implementations, the residual PRBs are only used for PSSCH transmission.

In some implementations, the residual PRBs include PSSCH rate matched bits.

In some implementations, the residual PRBs include PSSCH repeated bits.

In some implementations, the residual PRBs are not counted in TBS calculation.

In some implementations, allocating a resource pool of contiguous resource blocks for transmission to the other UE that includes the residual PRBs comprises can include allocating the residual PRBs into a last sub-channel of the allocated resource pool.

In some implementations, allocating a resource pool of contiguous resource blocks for transmission to the other UE that includes the residual PRBs can include allocating the residual PRBs equally across each of the sub-channels in a same resource block set.

In some implementations, allocating a resource pool of contiguous resource blocks for transmission to the other UE that includes the residual PRBs can include determining whether a resource block has a sub-channel that overlaps with a guard band of the resource pool, and based on a determination that the resource block has a sub-channel that overlaps with a guard band of the resource pool, allocating the residual PRBs equally across each of sub-channel of the resource black that does not overlap with the guard band.

The details of one or more embodiments of these systems and methods are set forth in the accompanying drawings and the description below. Other features, objects, and advantages of these systems and methods will be apparent from the description and drawings, and from the claims.

DETAILED DESCRIPTION

The present disclosure generally relates to resource allocation enhancement for sidelink. Enhancements to resource allocation in sidelink include resource allocation enhancement for contiguous RB-based transmission, resource allocation enhancement for interlaced RB-based transmission, resource allocation enhancement for co-existence with LTE sidelink, enhancements for residual PRBs in contiguous RB-based transmission, and enhancements for PSFCH transmission occasions.

In contiguous RB-based PSCCH/PSSCH transmissions in SL-U, some sub-channels may partly or fully overlap with the guard band. These sub-channels can not be used as the leading sub-channel in PSCCH/PSSCH transmission since PSCCH cannot be transmitted in guard band. This disclosure describes techniques for excluding resources that overlap the guard band.

This disclosure also describes an enhanced mode 2 resource selection procedure such that the selected resources are the same sub-channel indices across different RB sets. A new definition of a candidate single-slot resource for transmission is described as a set of correlated sub-channels.

This disclosure also describes how to support dynamic indication of PSFCH transmission occasions in SL-U. For example, this disclosure describes techniques for resource pool (pre-) configuration, including PSFCH occasions being (pre-) configured or PSFCH occasions being (pre-) configured and dynamically indicated.

For co-channel coexistence between LTE sidelink and NR sidelink, this disclosure describes resource allocation enhancements to support higher SCS for NR sidelink. For example, NR sidelink transmission can occupy both slots of a subframe irrespective of LTE sidelink transmission. This disclosure also describes a resource selection procedure to avoid the potential AGC issue to LTE sidelink reception.

This disclosure also describes how to address the remaining PRBs for contiguous RB-based PSCCH/PSSCH transmission in SL-U. For example, PRBs that belong to the last sub-channel are used only for PSSCH transmissions. Residual PRBs are equally distributed to all the sub-channels in the same RB set. If a sub-channel has overlap with guard band, then the residual PRBs are not allocated to this sub-channel.

Figure 1:
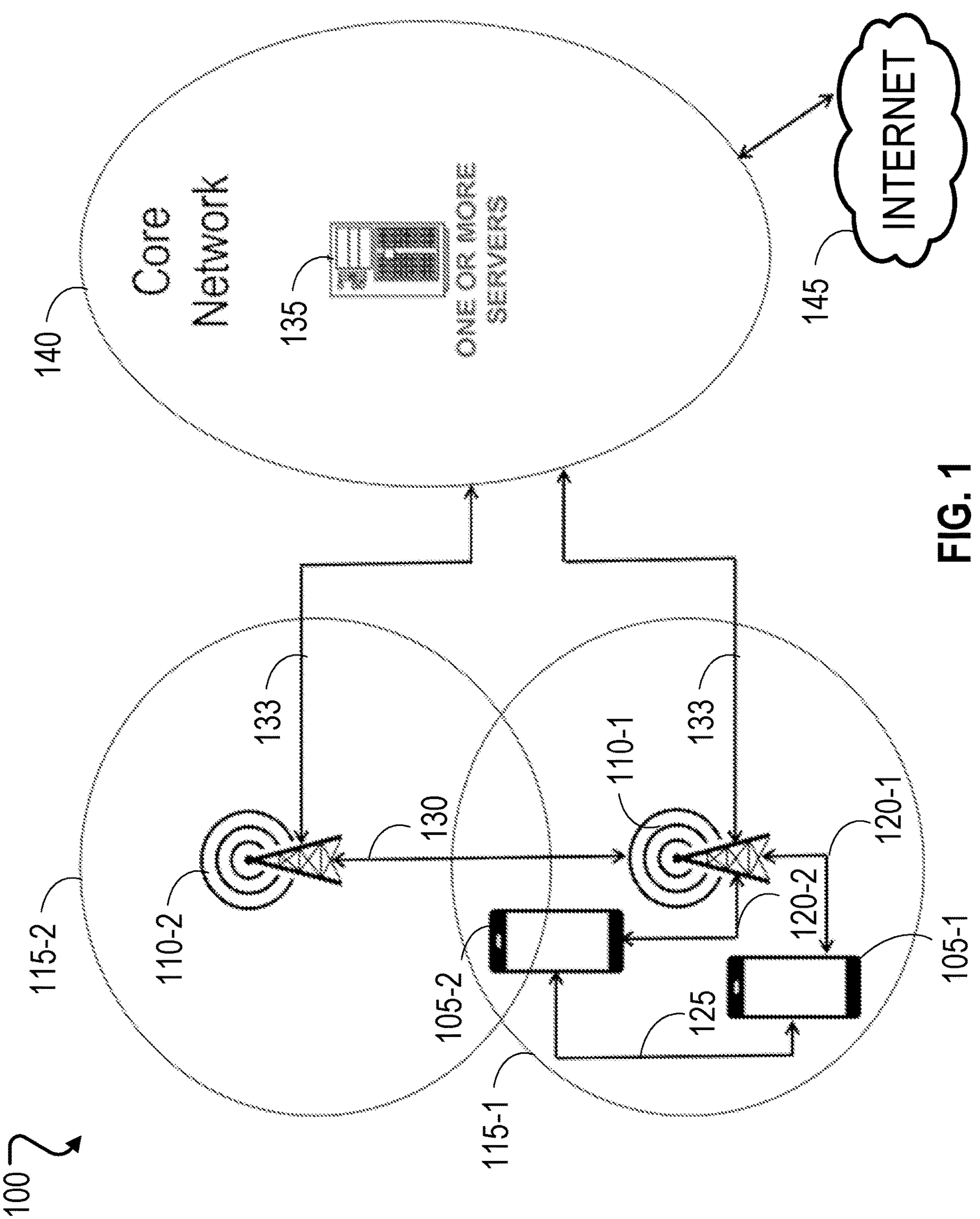
FIG. 1 illustrates an example communication system that includes sidelink communications, according to some implementations.

FIG. 1 illustrates an example communication system 100 that includes sidelink communications, according to some implementations. It is noted that the system of FIG. 1 is merely one example of a possible system, and that features of this disclosure may be implemented in other wireless communication systems.

The following description is provided for an example communication system that operates in conjunction with fifth generation (5G) networks as provided by 3GPP technical specifications. However, the example implementations are not limited in this regard and the described examples may apply to other networks that may benefit from the principles described herein, such as 3GPP Long Term Evolution (LTE) networks, Wi-Fi or Worldwide Interoperability for Microwave Access (WiMax) networks, and the like. Furthermore, other types of communication standards are possible, including future 3GPP systems (e.g., Sixth Generation (6G)), IEEE 802.16 protocols, or the like. While aspects may be described herein using terminology commonly associated with 5G NR, aspects of the present disclosure can be applied to other systems, such as 3G, 4G, and/or systems subsequent to 5G (e.g., 6G).

Frequency bands for 5G NR may be separated into two different frequency ranges. Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHZ. Bands in the millimeter wave (mm Wave) range of FR2 may have smaller coverage but potentially higher available bandwidth than bands in the FR1.

As shown, the communication system 100 includes a number of user devices. More specifically, the communication system 100 includes two UEs 105 (UE 105-1 and UE 105-2 are collectively referred to as "UE 105" or "UEs 105"), two base stations 110 (base station 110-1 and base station 110-2 are collectively referred to as "base station 110" or "base stations 110"), two cells 115 (cell 115-1 and cell 115-2 are collectively referred to as "cell 115" or "cells 115"), and one or more servers 135 in a core network (CN) 140 that is connected to the Internet 145.

In some implementations, the UEs 105 can directly communicate with base stations 110 via links 120 (link 120-1 and link 120-2 are collectively referred to as "link 120" or "links 120"), which utilize a direct interface with the base stations referred to as a "Uu interface." Each of the links 120 can represent one or more channels. The links 120 are illustrated as an air interface to enable communicative coupling, and can be consistent with cellular communication protocols, such as a GSM protocol, a CDMA network protocol, a UMTS protocol, a 3GPP LTE protocol, an Advanced long term evolution (LTE-A) protocol, a LTE-based access to unlicensed spectrum (LTE-U), a 5G protocol, a NR protocol, an NR-based access to unlicensed spectrum (NR-U) protocol, and/or any of the other communications protocols discussed herein.

As shown, certain user devices may be able to conduct communications with one another directly, e.g., without an intermediary infrastructure device such as base station 110-1. In this example, UE 105-1 may conduct communications directly with UE 105-2. Similarly, the UE 105-2 may conduct communications directly with UE 105-1. Such peer-to-peer communications may utilize a "sidelink" interface such as a PC5 interface. In certain implementations, the PC5 interface supports direct cellular communication between user devices (e.g., between UEs 105), while the Uu interface supports cellular communications with infrastructure devices such as base stations. For example, the UEs 105 may use the PC5 interface for a radio resource control (RRC) signaling exchange between the UEs (also called PC5-RRC signaling). The PC5/Uu interfaces are used only as an example, and PC5 as used herein may represent various other possible wireless communications technologies that allow for direct sidelink communications between user devices, while Uu in turn may represent cellular communications conducted between user devices and infrastructure devices, such as base stations.

In some implementations, the UEs 105 may be configured with parameters for communicating via the Uu interface and/or the sidelink interface. In some examples, the UEs 105 may be "pre-configured" with some parameters. In these examples, the parameters may be hardwired into the UEs 105 or coded into the specification. Additionally and/or alternatively, the UEs 105 may receive the parameters from the one or more of the base stations 110.

To transmit/receive data to/from one or more base stations 110 or UEs 105, the UEs 105 may include a transmitter/receiver (or alternatively, a transceiver), memory, one or more processors, and/or other like components that enable the UEs 105 to operate in accordance with one or more wireless communications protocols and/or one or more cellular communications protocols. The UEs 105 may have multiple antenna elements that enable the UEs 105 to maintain multiple links 120 and/or sidelinks 125 to transmit/receive data to/from multiple base stations 110 and/or multiple UEs 105. For example, as shown in FIG. 1, UE 105-1 may connect with base station 110-1 via link 120 and simultaneously connect with UE 105-2 via sidelink 125.

In some implementations, one or more sidelink radio bearers may be established on the sidelink 125. The sidelink radio bearers can include signaling radio bearers (SL-SRB) and/or data radio bearers (SL-DRB).

The PC5 interface may alternatively be referred to as a sidelink interface and may include one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), Physical Sidelink Feedback Channel (PSFCH), and/or any other like communications channels. The PSFCH carries feedback related to the successful or failed reception of a sidelink transmission. The PSSCH can be scheduled by sidelink control information (SCI) carried in the sidelink PSCCH. In some examples, the sidelink interface can operate on an unlicensed spectrum (e.g., in the unlicensed 5 Gigahertz (GHz) and 6 GHz bands) or a (licensed) shared spectrum.

In one example, the sidelink interface implements vehicle-to-everything (V2X) communications. The V2X communications may, for example, adhere to 3GPP Cellular V2X (C-V2X) specifications, or to one or more other or subsequent standards whereby vehicles and other devices and network entities may communicate. V2X communications may utilize both long-range (e.g., cellular) communications as well as short- to medium-range (e.g., non-cellular) communications. Cellular-capable V2X communications may be called Cellular V2X (C-V2X) communications. C-V2X systems may use various cellular radio access technologies (RATs), such as 4G LTE or 5G NR RATs (or RATs subsequent to 5G, e.g., 6G RATs). Certain LTE standards usable in V2X systems may be called LTE-Vehicle (LTE-V) standards. As used herein in the context of V2X systems, and as defined above, the term "user devices" may refer generally to devices that are associated with mobile actors or traffic participants in the V2X system, e.g., mobile (able-to-move) communication devices such as vehicles, pedestrian user equipment (PUE) devices, and road side units (RSUs).

In some implementations, UEs 105 may be physical hardware devices capable of running one or more applications, capable of accessing network services via one or more radio links 120 with a corresponding base station 110 (also referred to as a "serving" base station), and capable of communicating with one another via sidelink 125. Link 120 may allow the UEs 105 to transmit and receive data from the base station 110 that provides the link 120. The sidelink 125 may allow the UEs 105 to transmit and receive data from one another. The sidelink 125 between the UEs 105 may include one or more channels for transmitting information from UE 105-1 to UE 105-2 and vice versa and/or between UEs 105 and UE-type RSUs and vice versa.

In some implementations, the base stations 110 are capable of communicating with one another over a backhaul connection 130 and may communicate with the one or more servers 135 within the CN 140 over another backhaul connection 133. The backhaul connections can be wired and/or wireless connections.

In some implementations, the UEs 105 are configured to use a resource pool for sidelink communications. A sidelink resource pool defines the time-frequency resources used for sidelink communications, and may be divided into multiple time slots, frequency channels, and frequency sub-channels. In some examples, the UEs 105 are synchronized and perform sidelink transmissions aligned with slot boundaries. A UE may be expected to select several slots and sub-channels for transmission of the transport block. In some examples, a UE may use different sub-channels for transmission of the transport block across multiple slots within its own resource selection window.

In some implementations, an exceptional resource pool may be configured for the UEs 105, perhaps by the base stations 110. The exceptional resource pool includes resources that the UEs 105 can use in exceptional cases, such as Radio Link Failure (RLF). The exceptional resource pool may include resources selected based on a random allocation of resources.

In some implementations, a UE that is initiating a communication with another UE is referred to as a transmitter UE (TX UE), and the UE receiving the communication is referred to as a receiver UE (RX UE). For example, UE 105-1 may be a TX UE and UE 105-2 may be an RX UE. Although FIG. 1 illustrates a single TX UE communicating with a single RX UE, a TX UE may communicate with more than one RX UE via sidelink.

In some implementations, a TX UE that is initiating sidelink communication may determine the available resources (e.g., sidelink resources) and may select a subset of these resources to communicate with an RX UE based on a resource allocation scheme. Example resource allocation schemes include Mode 1 and Mode 2 resource allocation schemes. In Mode 1 resource allocation scheme (referred to as "Mode 1"), the resources are allocated by a network node for in-coverage UEs. In Mode 2 resource allocation scheme (referred to as "Mode 2"), the TX UE selects the sidelink resources (e.g., sidelink transmission resources).

In some implementations, the communication system 100 supports different cast types, including unicast, broadcast, and groupcast (or multicast) communications. Unicast refers to direction communications between two UEs. Broadcast refers to a communication that is broadcast by a single UE to a plurality of other UEs. Groupcast refers to communications that are sent from a single UE to a set of UEs that satisfy a certain condition (e.g., being a member of a particular group).

Figure 2:
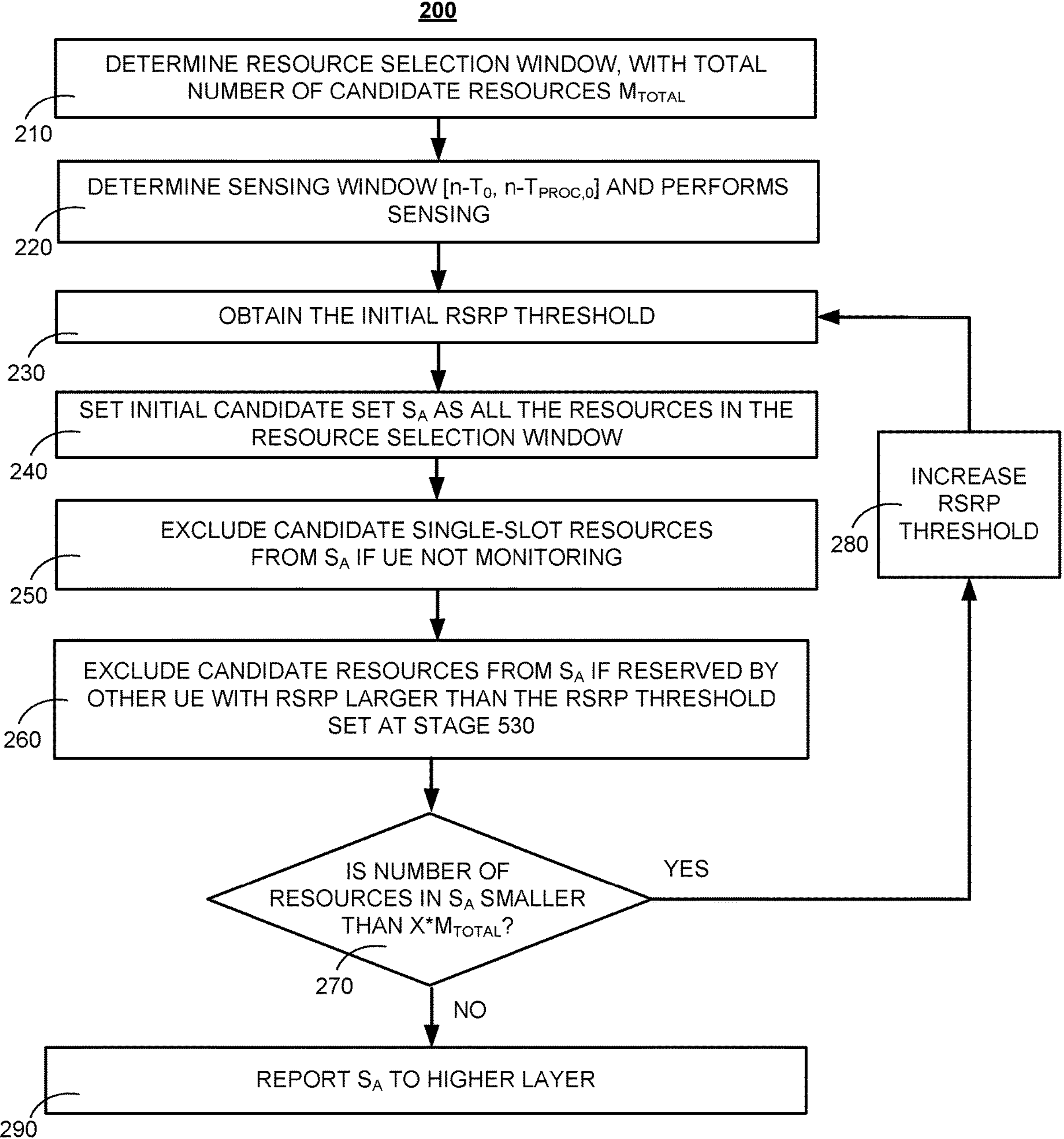
FIG. 2 illustrates a flowchart of an example of a process for NR resource selection procedure.
Figure 14:
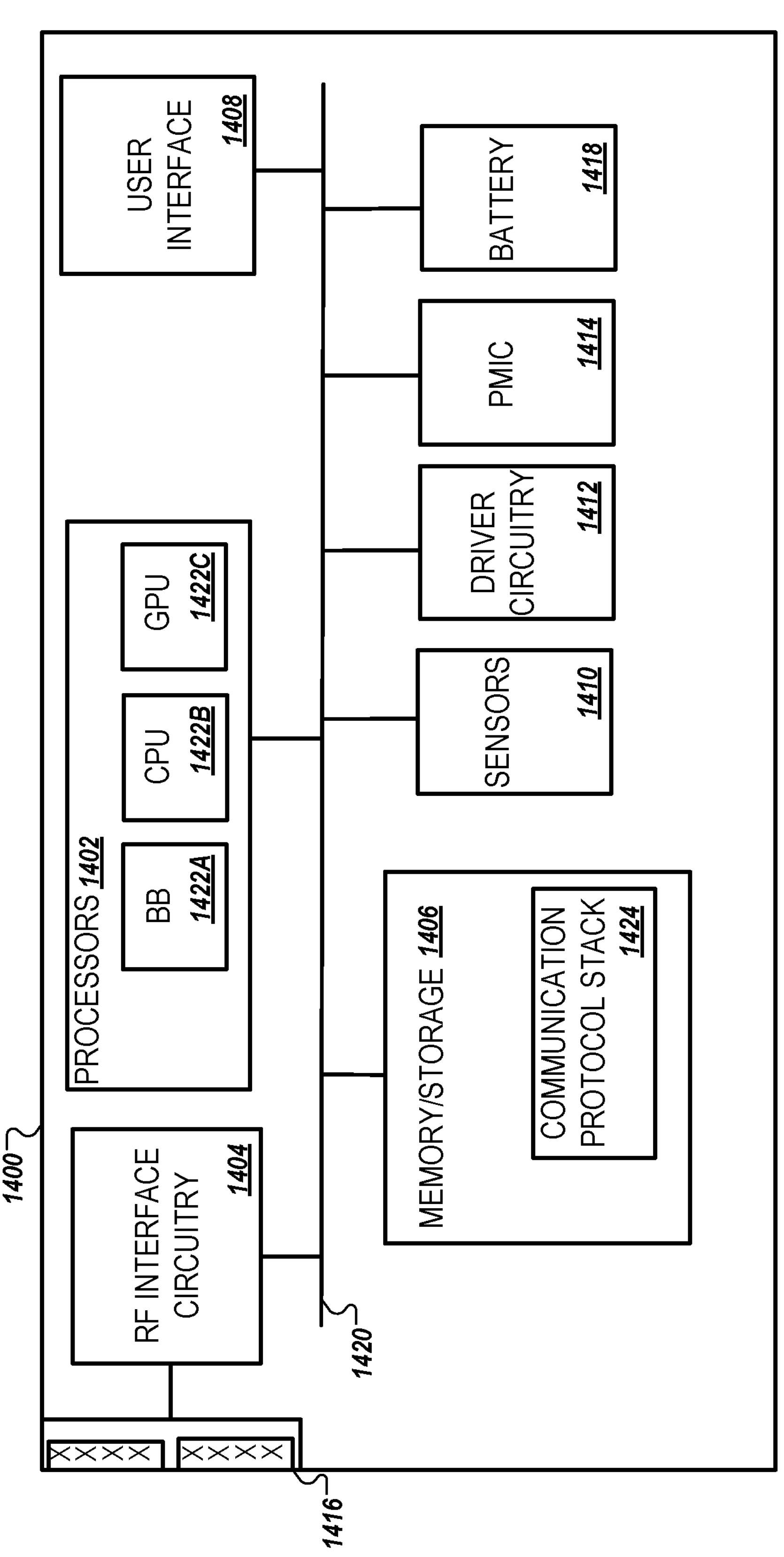
FIG. 14 illustrates an example user equipment (UE), according to some implementations.

FIG. 2 illustrates a flowchart of an example of a process 200 for NR resource selection procedure. The process 200 is based on NR V2X R16 and is described in more detail in TS 38.214, Section 8.1.4. The process 200 is provided such that it can be used as a reference for relatively timing of the exclusion of candidate resources from a candidate resource for sidelink resources selection as described with reference to one or more other processes described herein. The process 500 will be described as being performed by a UE (e.g., a TX UE or transmission UE) such as a UE 105-1 of FIG. 1, UE 105-2 of FIG. 1, or UE 1400 of FIG. 14. In other implementations, UE may be helper UE or UE-A in an inter-UE coordination (IUC) resources sharing operation, in which case UE 105-1 of FIG. 1, UE 105-2 of FIG. 1, or UE 1400 of FIG. 14 is still exemplary.

A UE can begin execution of the process 200 by determining a resource selection window ($n+T_1$, $n+T_2$), with total number of candidate resources $M_{total}$ (210). In this example, n is the time slot for triggering the resource selection/re-evaluation/pre-emption.

The selection of T1 is up to UE implementation under 0≤T1≤Tproc, 1, where Tproc, 1 is defined in slots in Table 1 where u is the SCS configuration of the SL BWP. If $T_2$ min is shorter than the remaining packet delay budget (in slots) then $T_2$ is up to UE implementation subject to $T_2$ min≤$T_2$≤remaining packet delay budget (in slots); otherwise $T_2$ is set to the remaining packet delay budget (in slots). In this example, $T_2$ min is an internal parameter set to the corresponding value from higher layer parameter "sl-SelectionWindowList" for the given value of prio_TX.

TABLE 1

| depending on sub-carrier spacing | |
|---|---|
| μ | [slots] |
| 0 | 3 |
| 1 | 5 |
| 2 | 9 |
| 3 | 17 |

The UE can continue execution of the process 200 by determining a sensing window [n-$T_0$, n-$T_{proc,0}$) (220), where T is configured and is defined in slots in Table 2 where μ is the SCS configuration of the SL BWP.

TABLE 2

| depending on sub-carrier spacing | |
|---|---|
| μ | [slots] |
| 0 | 1 |
| 1 | 1 |
| 2 | 2 |
| 3 | 4 |

The UE can continue execution of the process 200 by obtaining the initial RSRP threshold value(s) (230).

The UE can continue execution of the process 200 by setting initial candidate set $S_A$ as all resources in the resource selection window (240).

The UE can continue execution of the process 200 by excluding candidate single-slot resources from $S_A$ if UE is not monitoring the resource (250).

The UE can continue execution of the process 200 by excluding a candidate resource from $S_A$ if the candidate resource is reserved by other UE with RSRP larger than the RSRP threshold (260). In some implementations, the determination as to whether to exclude one or more candidate resources from $S_A$ at stage 260 can also be dependent on data priority level of a reserving SCI. For example, the determination at stage 260 can be performed using different RSRP thresholds based on the data priority level.

The UE can continue execution of the process 200 by determining whether a number of resources in $S_A$ is smaller than X*$M_{total}$ (270). Based on a determination at stage 270 that the number of resources in $S_A$ is smaller than X*$M_{total}$, the UE can continue execution of the process 200 by increasing the RSRP threshold 280 by, e.g., 3 dB and continuing execution of the process 200 at stage 240. Alternatively, if at stage 270 the UE determines that the number of resources in $S_A$ is not smaller than X*$M_{total}$, then UE can conclude the process 200 by reporting $S_A$ to a higher layer (290).

Figure 3:
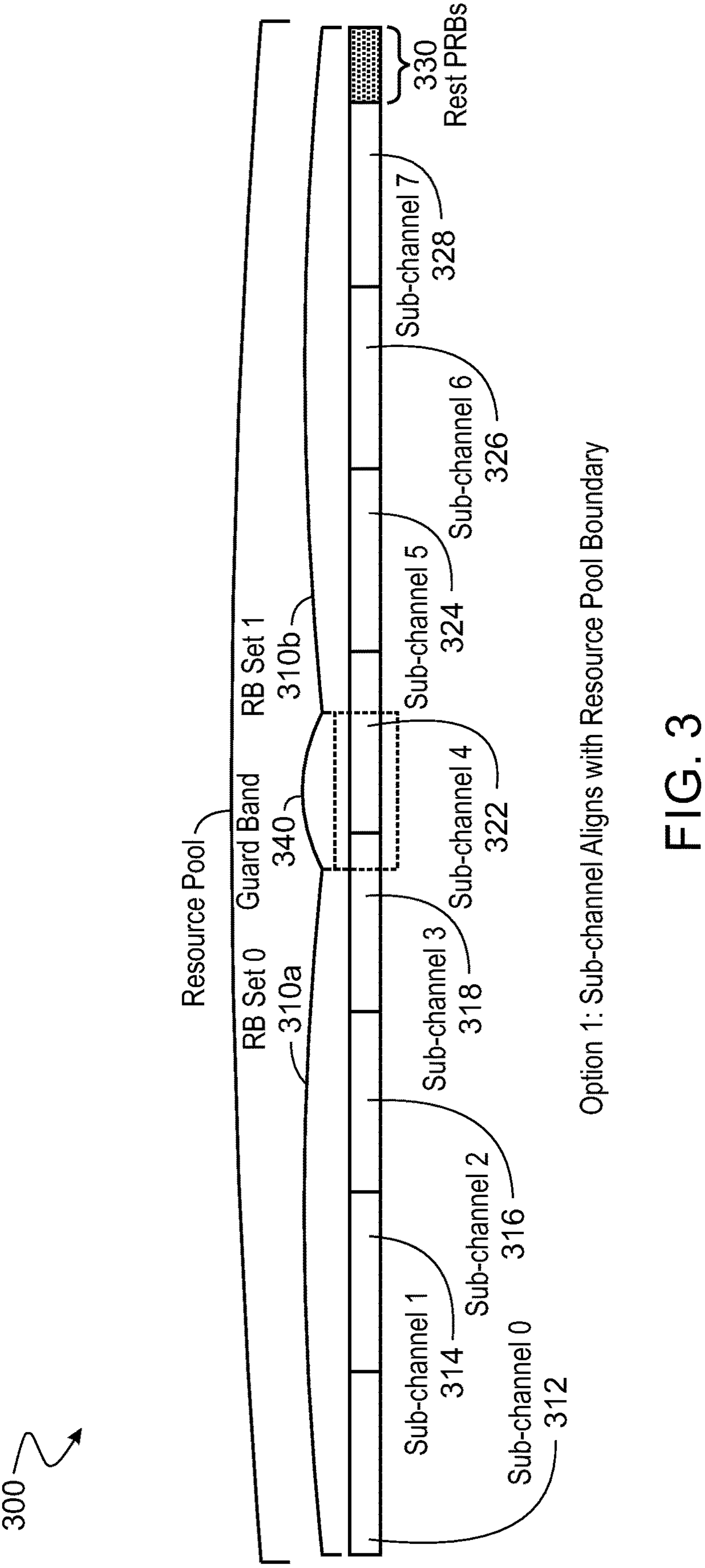
FIG. 3 illustrates a conceptual example of a resource pool NR sidelink.

FIG. 3 illustrates a conceptual example of a resource pool 300 NR sidelink. The resource pool 300 can include plurality of contiguous resource block sets such as resource block (RB) set 0 310*a* and RB set 1 310*b*. Each RB set 310*a*, 310*b* can include a plurality of contiguous sub-channels. For example, the RB set 0 310*a* includes contiguous sub-channel 0 312, sub-channel 1 314, sub-channel 2 316, and sub-channel 3 318. Likewise, the RB set 1 310*b* includes contiguous sub-channel 4 322, sub-channel 5 324, sub-channel 6 326, and sub-channel 7 328. In some instances, an RB set such as RB set 1 310*b* can also have one or more residual physical resource blocks (PRBs) 330. In some implementations, the residual PRBs can be the last contiguous sub-channel of a resource pool 300. In other implementations, the residual PRBs can be distributed across multiple sub-channels of a RB set in the resource pool 300. In such implementations, the multiple sub-channels can be all, or a subset, or the sub-channels of the RB set.

A resource pool 300 may have one or more intra-cell guard band 340 is a predetermined amount of cushion between the resource block sets that help to avoid interference. In some implementations of the present disclosure, sub-channels falling within the guard band are not used for PSCCH transmission.

Resource Allocation Enhancement for Contiguous RB-Based Transmission

In some implementations, prior to step 210 of FIG. 2, a UE can identify a set ($E_x$) of sub-channels not suitable serving as leading sub-channels for a Physical Sidelink Control Channel (PSCCH) and Physical Sidelink Shared Channel (PSSCH) transmission. In some implementations, a sub-channel belongs to $E_x$ if it has overlap with a guard band such as guard band 340. Alternatively, in some implementations, a sub-channel belongs to $E_x$ if its first Y RBs has overlap with guard band, where Y is the configured number of RBs for PSCCH.

In some implementations, a UE can exclude from the initial candidate resources the resources with leading sub-channel in $E_x$. In some implementations, step 210 of the FIG. 2 resource selection procedure can be modified by excluding resources with leading sub-channels in $E_x$ from candidate resource set. In such instances, the total number of candidate single-slot resources is $M_{total}$, already excluding the candidate resources whose leading sub-channel is in $E_x$. Then, step 270 of the FIG. 2 resource selection procedure may be based on the criteria of X*$M_{total}$, where X could be separately (pre) configured for the operations of contiguous RB-based transmission in SL-U.

Alternatively, in other implementations, a UE can exclude from candidate resources the resources with leading sub-channel in $E_x$ after step 210 of the FIG. 2 resource selection procedure such as, for example, before or after step 260 of the FIG. 2 resource selection procedure. In such instances, the total number of candidate single-slot resources is $M_{total}$, does not exclude the candidate resources whose leading sub-channel is in $E_x$. Then, step 270 of the FIG. 2 resource selection procedure may be based on the criteria of X*$M_{total}$, where X could be separately (pre) configured for the operations of contiguous RB-based transmission in SL-U. In such implementations, X could be a smaller number than 20%.

Figure 4:
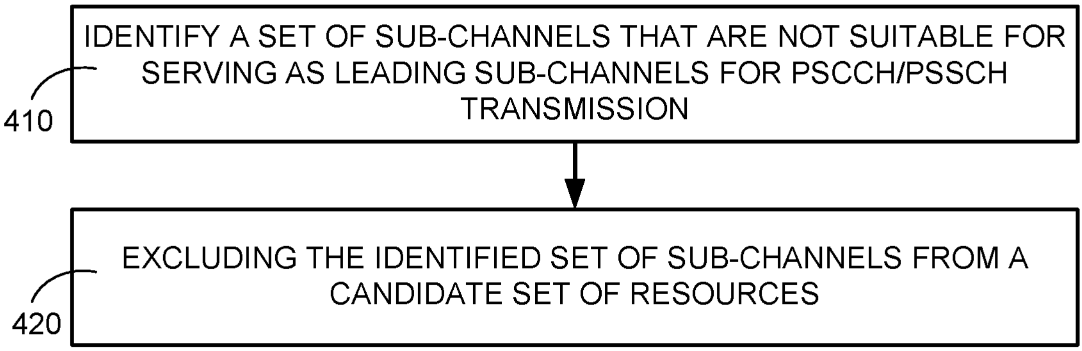
FIG. 4 illustrates a flowchart of an example of a process for resource allocation for contiguous resource block transmission.

FIG. 4 illustrates a flowchart of an example of a process 400 for resource allocation for contiguous resource block transmission. For convenience, the process 400 will be described as being performed by a UE such as, e.g., UE 105-1 of FIG. 1, UE 105-2 of FIG. 1, or UE 1400 of FIG. 14.

A UE can begin execution of the process 400 by identifying a set of sub-channels that are not suitable for serving as leading sub-channels for PSCCH/PSSCH transmission (410). In some implementations, the identifying of step 410 can include the UE identifying a set of sub-channels that each have an overlap with a guard band. In other implementations, the identifying of step 410 can include the UE identifying a set of sub-channels that each have a predetermined number of first resource blocks that overlap with a guard band.

The UE can continue execution of the process 400 by excluding the identified set of sub-channels from a candidate set of resources (420). In some implementations, excluding the identified set of sub-channels from a candidate set of resources at step 420 can include the UE excluding the candidate set of resources is an initial candidate set of resources. In some implementations, excluding the identified set of sub-channels from a candidate set of resources at step 420 can include the UE excluding the sub-channels from a total number of candidate resources $M_{TOTAL}$ in step 210 of FIG. 2.

In some implementations, excluding the identified set of sub-channels from a candidate set of resources at stage 420 can include the UE excluding the identified set of sub-channels from a subsequent candidate set of resources that is evaluated for resource exclusion after an initial candidate set of resources is evaluated for resource exclusion. In some implementations, excluding the identified set of sub-channels from a candidate set of resources comprises excluding the identified set of sub-channels after step 210 of FIG. 2. For example, in some implementations, excluding the identified set of sub-channels from a candidate set of resources at step 420 can include excluding the identified set of sub-channels after step 210 of FIG. 2 and before Step 260 of FIG. 2. In some implementations, excluding the identified set of sub-channels from a candidate set of resources at step 420 can include excluding the identified set of sub-channels after Step 260 of FIG. 2

In some implementations, step 270 of FIG. 2 is based on X times a total number or resource ($M_{TOTAL}$), wherein $S_A$ already excludes the identified set of sub-channels. In some implementations, X is (pre) configured for the operations of the contiguous resource block transmission in sidelink on unlicensed spectrum (SL-U). In some implementations, step 270 of FIG. 2 is based on X times a total number or resource ($M_{TOTAL}$), wherein Sm does not exclude the identified set of sub-channels. In some implementations, X is (pre) configured for the operations of the contiguous resource block transmission in sidelink on unlicensed spectrum (SL-U). In some implementations, X is less than 0.20.

Figure 5:
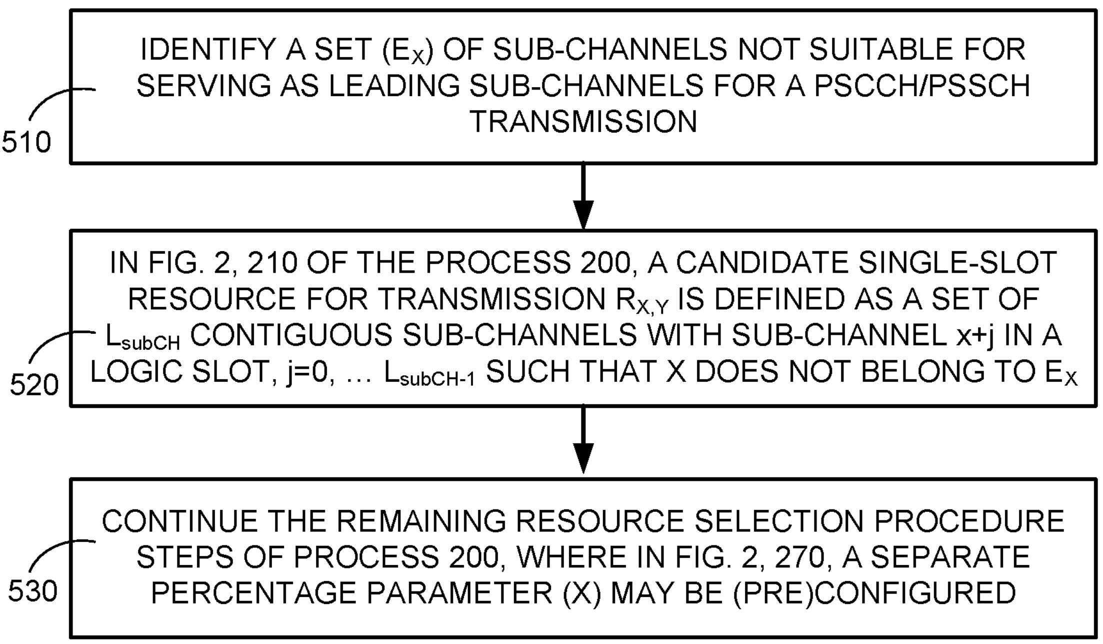
FIG. 5 illustrations a flowchart of another example of a process for resource allocation for contiguous resource block transmission.

FIG. 5 illustrations a flowchart of another example of a process 500 for resource allocation for contiguous resource block transmission. For convenience, the process 500 will be described as being performed by a UE such as, e.g., UE 105-1 of FIG. 1, UE 105-2 of FIG. 1, or UE 1400 of FIG. 14.

The UE can continue execution of the process 500 by identifying a set ($E_x$) of sub-channels not suitable for serving as leading sub-channels for a PSCCH/PSSCH transmission (510).

The UE can continue execution of the process 500 by defining, in step 210 of FIG. 2, a candidate single-slot resource for transmission Rx,y as a set of $L_{subCH}$ contiguous sub-channels with sub-channel x+j in a logic slot, j=0, . . . . $L_{subCH-1}$ such that x does not belong to $E_x$ (520).

The UE can continue execution of the process 500 by continuing execution of the remaining resource selection procedure steps in FIG. 2, process 200, where in, FIG. 2, step 270, a separate percentage parameter (X) may be (pre) configured. In some implementations, X may be equal to or less than 20%.

Resource Allocation Enhancement for Interlace RB-Based Transmission

Figure 6:
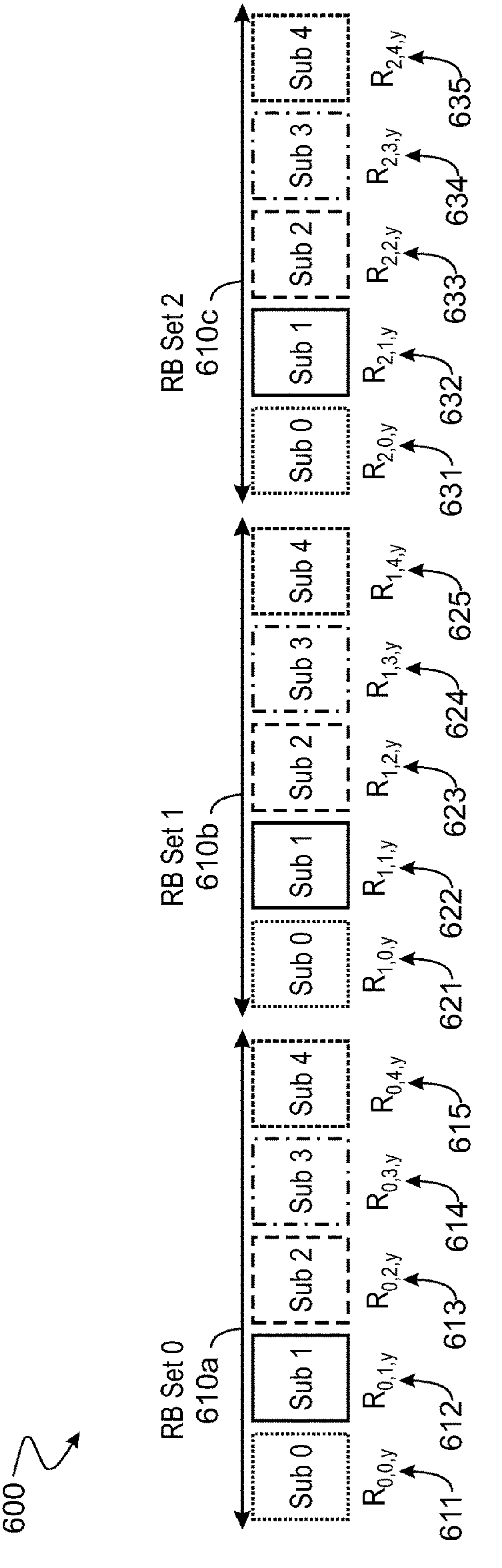
FIG. 6 illustrates a conceptual example of a resource pool for NR sidelink having contiguous resource block (RB) sets.

FIG. 6 illustrates a conceptual example of a resource pool 600 for NR sidelink having contiguous resource block (RB) sets. The resource pool 600 can include a plurality of contiguous resource block (RB) sets 610*a*, 610*b*, 610*c*. Each resource block set can include a plurality of contiguous resources 611, 612, 613, 614, 615, 621, 622, 623, 624, 625, 631, 632, 633, 634, 635.

For interlaced RB-based transmission, a new definition of candidate single-slot resource for transmission can be adopted. In some implementations, a candidate single-slot resources ($\overline{R}_{w,x,y}$) can be defined as a set of $L_{subCH}$ correlated sub-channels in logic slot $t'_y$. Examples of a different interlaced RB-based transmissions are set forth below, with resources labels corresponding to the resource labels of the resources 611, 612, 613, 614, 615, 621, 622, 623, 624, 625, 631, 632, 633, 634, 635 of the resource pool 600 in FIG. 6.

In a first example, contiguous sub-channels in the same RB set can be allocated. This can be notated as sub-channels x+j, j=0, . . . , $L_{subCH}-1$. With reference to FIG. 6, for example, $L_{subCH}=2$; $(R_{0,0,y}, R_{0,1,y})$, $(R_{0,1,y}, R_{0,2,y})$, $(R_{0,2,y}, R_{0,3,y})$, $(R_{0,3,y}, R_{0,4,y})$, . . .

In a second example, same sub-channel over contiguous RB sets can be allocated. This can be notated as RB set index: w+k, k=0, . . . , $L_{subCH}-1$. With reference to FIG. 6, for example, $L_{subCH}=2$; $(R_{0,0,y}, R_{1,0,y})$, $(R_{1,0,y}, R_{2,0,y})$, . . .

In a third example, same contiguous sub-channels over contiguous RB sets can be allocated. This can be notated as sub-channels: x+j and RB set index: w+k, where j=0, . . . , J−1 and $K=L_{subCH}/J$. With reference to FIG. 6, for example, $L_{subCH}=4$; $(R_{0,0,y}, R_{0,1,y}, R_{1,0,y}, R_{1,1,y})$, $(R_{1,0,y}, R_{1,1,y}, R_{2,0,y}, R_{2,1,y})$, . . .

Figure 7:
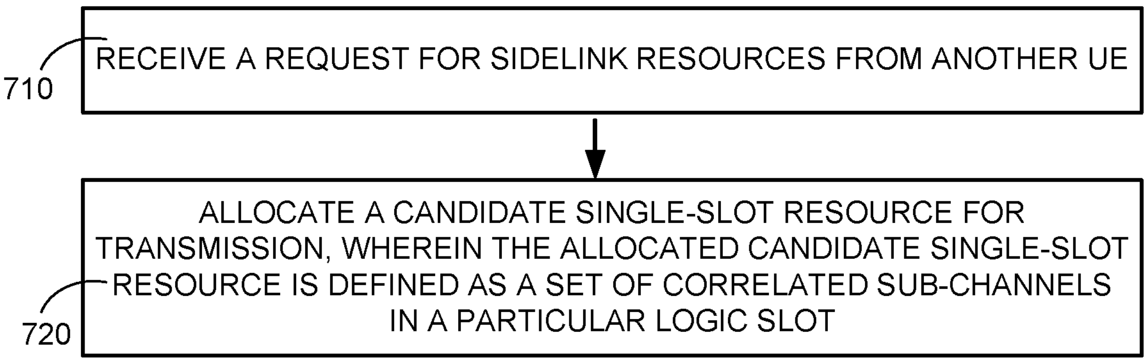
FIG. 7 illustrates a flowchart of an example of a process for resource allocation for interlaced resource block transmission.

FIG. 7 illustrates a flowchart of an example of a process 700 for resource allocation for interlaced resource block transmission. For convenience, the process 700 will be described as being performed by a UE such as, e.g., UE 105-1 of FIG. 1, UE 105-2 of FIG. 1, or UE 1400 of FIG. 14.

A UE can begin execution of the process 700 by receiving a request for sidelink resources from another UE 710.

The UE can continue execution of the process 700 by allocating a candidate single-slot resource for transmission, wherein the allocated candidate single-slot resource is defined as a set of correlated sub-channels in a particular logic slot. Whereas Physical slots are the slots in time domain, logic slots are slots in resource pool for sidelink transmissions. Note that not every physical slot is in resource pool, hence logic slots are a subset of physical slots. For example, physical slots S1, S2, S3, where S1 and S3 are in a resource pool. Then logic slots, L1 and L2, where L1=S1, L2=S3.

In some implementations, the allocated single-slot resource comprises contiguous sub-channels in a same resource block set.

In some implementations, the allocated single-slot resource comprises a same sub-channel over contiguous resource block sets. In some implementations, the same sub-channel over contiguous resource block sets means the sub-channel index in these RB set is same. For example, in FIG. 6, sub-channel 611 is same as sub-channel 621 or sub-channel 631, since all of them have the same sub-channel index (i.e., "sub-channel 0") in each RB set.

In some implementations, the allocated single-slot resource comprises a same contiguous sub-channel over contiguous resource block sets.

PSFCH Transmission Occasions

In some implementations, a resource pool can be (pre) configuration for Physical Sidelink Feedback Channel (PSFCH) transmission occasions using one of the following implementations.

In some implementations, PSFCH occasion(s) are (pre-) configured. In other implementations, PSFCH occasion(s) are (pre-) configured and dynamically indicated In some implementations, signaling bits can be used to indicate PSFCH transmission occasions. For example, assume there are X PSFCH transmission occasions (pre) configured by resource pool.

In some implementations, the signaling bits can include, for example, a bitmap of X-bits to indicate which PSFCH transmission occasions will be applied. In such implementations, a bit 1 can indicate the corresponding PSFCH transmission occasion will be applied and a bit 0 can indicate the corresponding PSFCH transmission occasion will not be used.

In other implementations, the signaling bits can include $\lceil \log_2 X \rceil$ bits to indicate the earliest PSFCH transmission occasions will be applied, where X is the (pre) configured number of PSFCH transmission occasions. In such implementations, all the following PSFCH transmission occasions will autonomously be applied.

In some implementations, the container for the signaling bits can include an SCI stage 1 of PSCCH/PSSCH transmission. In other implementations, the container for the signaling bits can include SCI stage 2 of PSCCH/PSSCH transmission.

Figure 8:
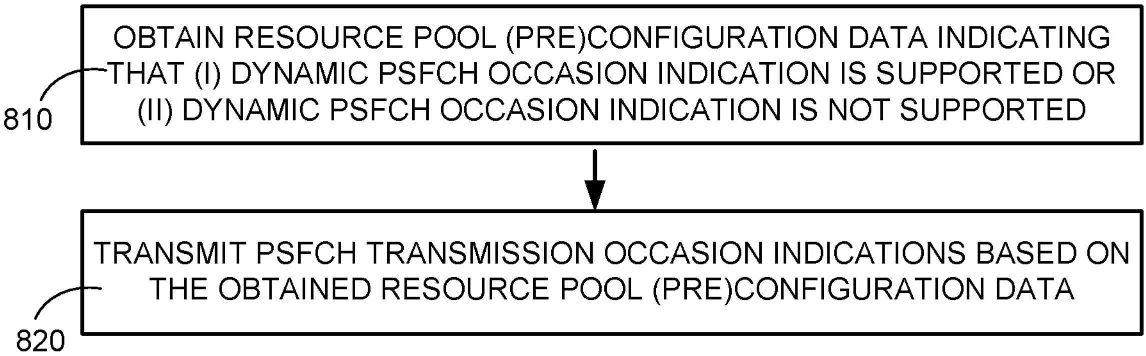
FIG. 8 illustrates a flowchart of an example of a process for PSFCH transmission occasion indications.

FIG. 8 illustrates a flowchart of an example of a process 800 for PSFCH transmission occasion indications. For convenience, the process 800 will be described as being performed by a UE such as, e.g., UE 105-1 of FIG. 1, UE 105-2 of FIG. 1, or UE 1400 of FIG. 14.

A UE can begin execution of the process 800 by obtaining resource pool (pre) configuration data indicating that (i) dynamic PSFCH occasion indication is supported or (ii) dynamic PSFCH occasion indication is not supported (810).

The UE can continue execution of the process 800 by transmitting PSFCH transmission occasion indications based on the obtained resource pool (pre) configuration data (820).

In some implementations, the obtained resource pool (pre) configuration data indicates that (i) dynamic PSFCH occasion indication is supported. In such implementations, transmitting PSFCH transmission occasion indications of step 820 based on the obtained resource pool (pre) configuration data can include the UE transmitting SCI of a PSCCH/PSSCH transmission, wherein the SCI of the PSCCH/PSSCH transmission indicates the PSFCH transmission occasions that are to be applied.

In some implementations, the one or more SCI of the PSCCH/PSSCH transmission are SCI stage 1 of the PSCCH/PSSCH transmission.

In some implementations, the one or more SCI of the PSCCH/PSSCH transmission are SCI stage 2 of the PSCCH/PSSCH transmission.

In some implementations, the obtained resource pool (pre) configuration data indicates that dynamic PSFCH occasion indication is not supported. In other implementations, when the obtained resource (pre) configuration data indicates that dynamic PSFCH occasion indication is supported, transmitting PSFCH transmission occasion indications at step 820 based on the obtained resource pool (pre) configuration data can include the UE transmitting a number of bits indicating which PSFCH transmission occasions are to be applied.

In some implementations, transmitting a number of bits indicating which PSFCH transmission occasions are to be applied can include the UE transmitting a bitmap having a number of bits that indicate which PSFCH transmission occasion that are to be applied, wherein each bit of the bitmap corresponds to a particular PSFCH transmission occasion, with the number of bits of the bitmap corresponds to a number of (pre) configured PSFCH transmission occasions.

In some implementations, each bit of the bitmap is a 1 or a 0, with a 1 indicating that the corresponding PSFCH transmission occasion is to be applied and a 0 indicating that the corresponding PSFCH transmission occasion is not to be applied. In some implementations, the bitmap is transmitted using SCI stage 1 of PSCCH/PSSCH transmission. In some implementations, the bitmap is transmitted using SCI stage 2 of PSCCH/PSSCH transmission.

In some implementations, transmitting a number of bits indicating which PSFCH transmission occasions are to be applied can include the UE transmitting a $\lceil \log_2 X \rceil$ bits to indicate the earliest PSFCH transmission occasions that are to be applied, where X is the (pre) configured number of PSFCH transmission occasions. In some implementations, each of the PSFCH transmission occasions after the earliest indicated PSFCH transmission are autonomously applied. In some implementations, the transmitted bits are transmitted using SCI stage 1 of PSCCH/PSSCH transmission. In some implementations, the transmitted bits are transmitted using SCI stage 2 of PSCCH/PSSCH transmission.

Figure 9:
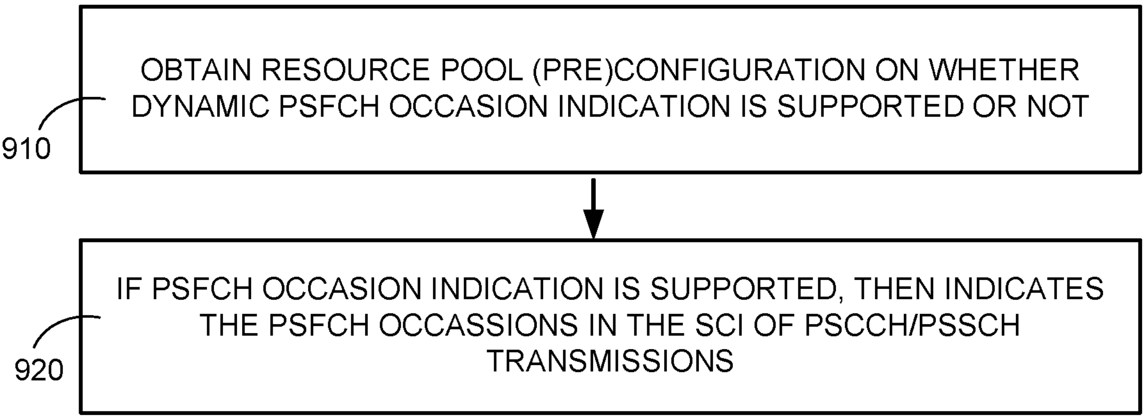
FIG. 9 illustrates a flowchart of another example of a process for PSFCH transmission occasion indications.

FIG. 9 illustrates a flowchart of another example of a process 900 for PSFCH transmission occasion indications. For convenience, the process 900 will be described as being performed by a UE such as, e.g., UE 105-1 of FIG. 1, UE 105-2 of FIG. 1, or UE 1400 of FIG. 14.

A UE can begin execution of the process 900 by obtaining resource pool (pre) configuration on whether dynamic PSFCH occasion indication is supported or not (910).

The UE can continue execution of the process 900 by determining if PSFCH occasion indication is supported, and then indicates the PSFCH occasions in the SCI of PSCCH/PSSCH transmissions (920).

Resource Allocation Enhancement for Co-Existence With LTE Sidelink

In some implementations, assume LTE sidelink is 15 kHz SCS and NR sidelink is 30 kHz SCS. NR sidelink could be 60 kHz SCS in general, and the solution can be extended similarly. In addition, assume LTE sidelink resource pool shares the same time-and-frequency resources with NR sidelink resource pool. In such instances, an issue can arise if NR sidelink transmission occurs in one slot out of a subframe, then it causes AGC to LTE sidelink reception.

In some implementations, NR sidelink transmission has to occupy both slots of a subframe irrespective of LTE sidelink transmissions. In such implementations, enhanced resource selection procedure is achieved by using a "two-slot resource." For example, a candidate resource for transmission $R_{x,y}$ can be defined as a two-slot resource.

In step 210 of FIG. 2, for a set of $L_{subCH}$ contiguous sub-channel with sub-channel x+j, j=0, . . . , $L_{subCH}-1$ in slots $t'_y$, $t'_{y+1}$. In some implementations, the slots could be logic slots or physical slots. $t_y'$ is aligned with the starting position of a subframe in LTE sidelink.

If the first slot of resource selection window is not aligned with the starting position of a subframe, then the resource selection window is delayed to align with the starting position of a subframe.

If the last slot of resource selection window is not aligned with the ending position of a subframe, then the resource selection window is either prolonged or shortened to the ending position of a subframe.

In step 250 of FIG. 2, the UE shall exclude any candidate two-slot resources $R_{x,y}$ over all sub-channels from the set $S_A$ if UE has not monitored a slot and for any periodicity value allowed and a hypothetical SCI set to extend the unmonitored slot to either $t'_y$, $t'_{y+1}$.

In step 260 of FIG. 2, the UE shall exclude a candidate two-slot resource $R_{x,y}$ from the set $S_A$ if any single-slot resources have been reserved by another UE.

In some implementations, NR sidelink transmission has to occupy first slot of a subframe irrespective of LTE sidelink transmissions. For example, in some implementations, enhanced resource selection procedure can be achieved with a "leading slot resource."

In such implementations, prior to performance of step 210 of FIG. 2, a UE can identify a set ($E_x$) of slots not aligned with the starting of a subframe. Then, step 210 of FIG. 2 can be modified by excluding resources in slots belonging to $E_x$.

Alternatively, an enhanced resource selection procedure in MAC layer can be used. At PHY layer, at least a subset of candidate resources reported to MAC layer which are aligned with the starting of a subframe in LTE sidelink resource. When PHY layer reports a set of candidate resources $S_A$, MAC first identifies a subset SB of candidate resources which are aligned with the starting of a subframe in LTE sidelink resource. If the number of resources in SB is above a certain threshold, then randomly select resources from SB. Threshold could be a certain number, or a certain percentage over the total number of resources in resource selection window. If the number of resources in SB is below a certain threshold, then trigger another resource selection procedure with increased number of percentage (i.e., parameter "sl-TxPercentageList"). Current possible values of sl-TXPercentage include 20%, 35%, 50%. Higher values of sl-TxPercentage could be introduced, e.g., 70%, 80%.

In some implementations, NR sidelink transmission has to occupy first slot of a subframe in case of LTE sidelink transmissions. In some implementations, the resource selection procedure FIG. 2 can be enhanced with "extended resource exclusion." In this implementation, at step 260 of FIG. 2, a UE can determine if another LTE UE reserves a LTE sidelink resource in a subframe, then all the single-slot resources time overlapping with the second half of the subframe are excluded from $S_A$. Priority and RSRP measurement are considered in a legacy manner.

In some implementations, NR sidelink transmission has to occupy both slots of a subframe in case of LTE sidelink transmissions. In some implementations, resource selection procedure is enhanced with "extended resource combining." In this implementation, at step 260 of FIG. 2, a UE can determine if another LTE UE reserves a LTE sidelink resource in a subframe which time overlaps with slots y and y+1, then, based on that determination, the UE can perform one of the following operations.

First, if the UE determines that $R_{x,y}$ is in $S_A$, but $R_{x,y+1}$ is not in $S_A$, then the UE can exclude $R_{x,y}$ from $S_A$. Alternatively, if the UE determines that $R_{x,y+1}$ is in $S_A$, but $R_{x,y}$ is not in $S_A$, then the UE can exclude $R_{x,y+1}$ from $S_A$. Alternatively, if both $R_{x,y}$ and $R_{x,y+1}$ are in $S_A$, then the UE can combine the resource $R_{x,y}$ and $R_{x,y+1}$ in $S_A$. Priority and RSRP measurement are considered in a legacy way.

In some implementations, the present disclosure provides resource allocation in handling PSFCH transmissions. Issues can arise in such a scenario, as NR sidelink PSFCH transmission will lead to AGC issues to LTE sidelink PSCCH/PSSCH reception. Current systems avoid PSFCH transmissions overlapping with LTE SL resources reserved for LTE SL transmissions in the time domain is ensured by the UE transmitting PSCCH/PSSCH. However, it is considered as to whether/how to define condition(s) of selecting NR SL candidate resources for NR SL PSCCH/PSSCH.

A solution to the aforementioned issues is to use an NR sidelink module to exclude NR sidelink candidate resources in a slot whose corresponding PSFCH transmission occasion overlapping with LTE sidelink reservations in time domain. This procedure is conducted if NR sidelink PSCCH/PSSCH transmission supports sidelink HARQ-ACK feedback. Higher layer provides a parameter to PHY layer on whether sidelink HARQ-ACK feedback is used for the PSCCH/PSSCH transmission when triggering resource selection. This procedure is conducted if the highest priority among LTE sidelink reservations on the conflicting sub-frame is higher than a (pre) configured threshold. This procedure is conducted if the highest priority among LTE sidelink reservations on the conflicting sub-frame is higher than the priority of NR sidelink transmission.

Figure 10:
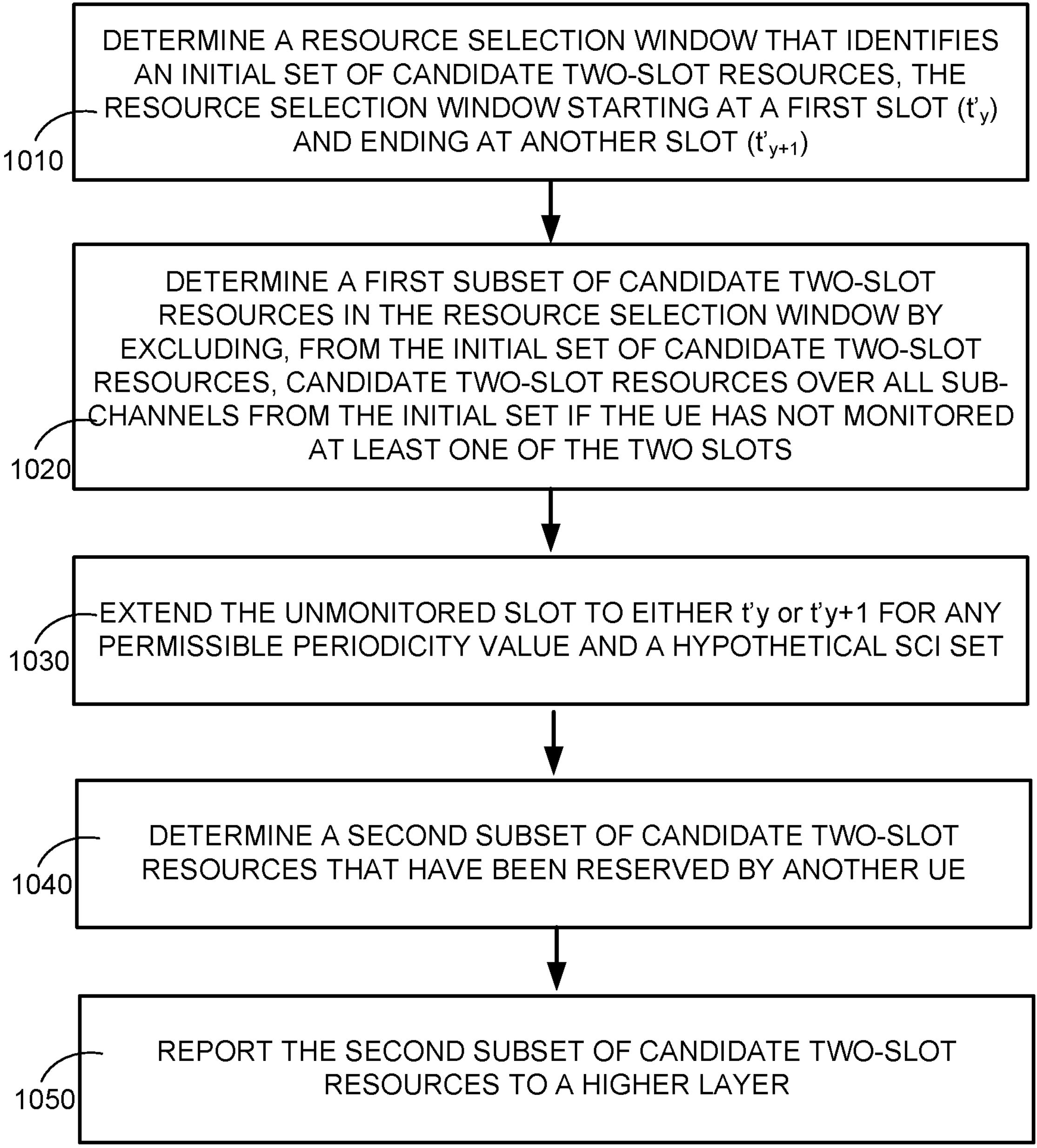
FIG. 10 illustrates a flowchart of an example of a process for resource allocation enhancement for co-existence with LTE sidelink.

FIG. 10 illustrates a flowchart of an example of a process for resource allocation enhancement for co-existence with LTE sidelink. For convenience, the process 1000 will be described as being performed by a UE such as, e.g., UE 105-1 of FIG. 1, UE 105-2 of FIG. 1, or UE 1400 of FIG. 14.

A UE can begin execution of the process 1000 by determining a resource selection window that identifies an initial set of candidate two-slot resources, the resource selection window starting at a first slot ($t'_y$) and ending at another slot ($t'_{y+1}$) (1010).

The UE can continue execution of the process 1000 by determining a first subset of candidate two-slot resources in the resource selection window by excluding, from the initial set of candidate two-slot resources, candidate two-slot resources over all sub-channels from the initial set if the UE has not monitored at least one of the two slots (1020);

The UE can continue execution of the process 1000 by extending the unmonitored slot to either $t'_y$ or $t'_{y+1}$ for any permissible periodicity value and a hypothetical SCI set (1030).

The UE can continue execution of the process 1000 by determining a second subset of candidate two-slot resources by excluding, from the first subset of candidate two-slot resources any single-slot resources that have been reserved by another UE (1040).

The UE can continue execution of the process 1000 by reporting the second subset of candidate two-slot resources to a higher layer (1050).

In some implementations, determining a resource selection window at step 1010 that identifies an initial set of candidate two-slot resources, the resource selection window starting at a first slot ($t'_y$) and ending at another slot ($t'_{y+1}$) occurs in step 210 of FIG. 2.

In some implementations, the excluding, from the initial set of candidate two-slot resources, candidate two-slot resources over all sub-channels from the initial set if the UE has not monitored at least one of the two slots occurs in step 250 of FIG. 2.

In some implementations, the excluding, from the initial set of candidate two-slot resources any single-slot resources at step 1020 that have been reserved by another UE occurs in step 260 of FIG. 2.

In some implementations, determining a resource selection window at step 1010 that identifies an initial set of candidate two-slot resources, the resource selection window starting at a first slot ($t'_y$) and ending at another slot ($t'_{y+1}$) can include the UE determining whether the first slot ($t'_y$) of the resource selection window is not aligned with the starting position of a subframe in LTE sidelink. Then, based on a determination that the first slot ($t'_y$) is not aligned with the starting position of a subframe in LTE sidelink, the UE can continue execution of the process 1000 by delaying the resource selection window to align with a starting position of a subframe in LTE sidelink.

In some implementations, determining a resource selection window at step 1010 that identifies an initial set of candidate two-slot resources, the resource selection window starting at a first slot ($t'_y$) and ending at another slot ($t'_{y+1}$) can include the UE determining whether the last slot ($t'_{y+1}$) of the resource selection window is not aligned with an ending position of a subframe in LTE sidelink. Then, based on a determination that the last slot ($t'_{y+1}$) of the resource selection window is not aligned with an ending position of a subframe in LTE sidelink, the UE can continue execution of the process 1000 by prolonging or shortening the resource selection window to an ending position of a subframe in LTE sidelink.

In some implementations, the slots are logic slots or physical slots.

Figure 11:
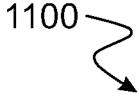
FIG. 11 illustrates a conceptual example of a set of slots not aligned with a starting subframe in LTE sidelink that have been excluded.
Figure 11:
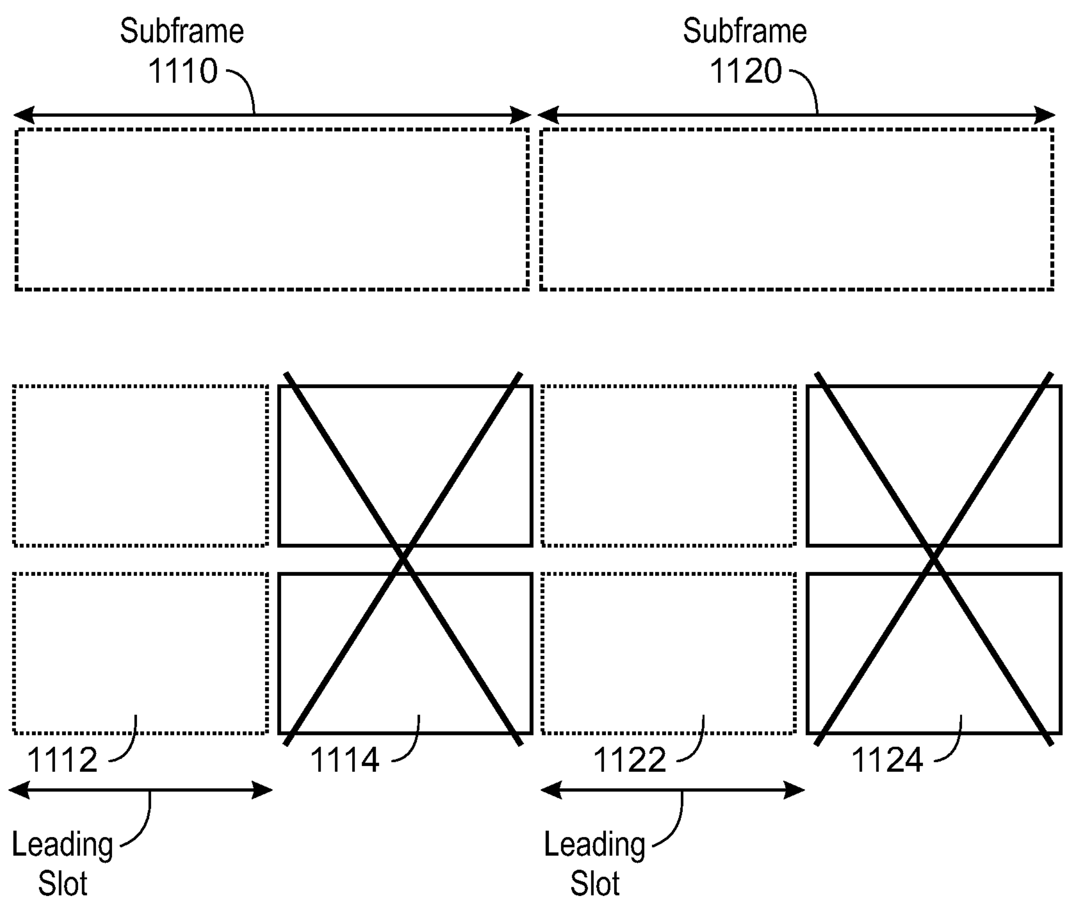

In some implementations, execution of the process 1000 includes the UE identifying a set of slots ($E_x$) that are not aligned with a starting of a subframe in LTE sidelink, and excluding the identified set of slots ($E_x$) from the initial set of candidate resources. FIG. 11 illustrates a conceptual example 1100 of a set of slots 1114, 1124 not aligned with a starting subframe in LTE sidelink that have been excluded. FIG. 11 illustrates two subframes: a first subframe 1110 and a second subframe 1120. The set of slots includes a leading slot 1112 and a leading slot 1122. Leading slots are aligned to the start of a subframe. The excluded slots, such as slot 1114 and slot 1124 are not aligned with the start of a subframe.

Figure 12:
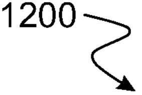
FIG. 12 illustrates a conceptual example of a set of slots where a single slot resource time overlapping with the second half of the subframe in LTE sidelink that have been excluded.
Figure 12:
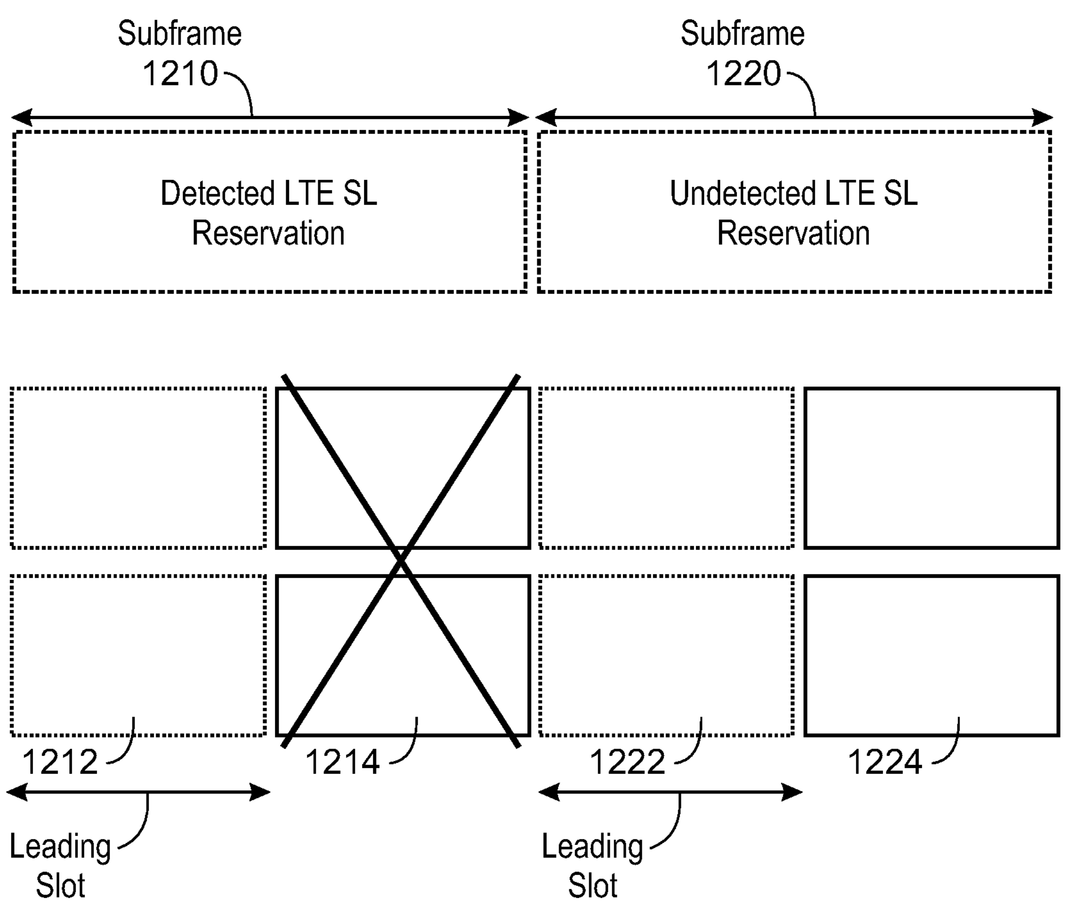

In some implementations, execution of the process 1000 include the UE determining that another LTE UE has reserved an LTE sidelink resource in a subframe in LTE sidelink. Then, based on the determination that the other LTE UE has reserved an LTE sidelink resource in a subframe in LTE sidelink, the UE can continue execution of the process 1000 by excluding, from the second subset of candidate two-slot resources, each of the single-slot resources that are time overlapping a second half of the subframe. FIG. 12 illustrates a conceptual example 1200 of a set of slots 1214 where a single slot resource time overlapping with the second half of the subframe in LTE sidelink that have been excluded.

In some implementations, the UE continue execution of the process 1000 by determining that another LTE UE reserves an LTE sidelink resource in a subframe that time overlaps with a first slot and a second slot.

In some implementations, the UE can continue execution of the process 1000 by determining that a first resource associated with the first slot is in the second subset of candidate two-slot resources and a second resource associated with the second slot is not in the second subset of candidate two-slot resources. Then, based on a determination that a first resource associated with the first slot is in the second subset of candidate two-slot resources and a second resource associated with the second slot is not in the second subset of candidate two-slot resources, the UE can continue execution of the process 1000 by excluding the first resource from the second subset of candidate two-slot resources.

In some implementations, UE can continue execution of the process 1000 by determining that a first resource associated with the first slot is not in the second subset of candidate two-slot resources and a second resource associated with the second slot is in the second subset of candidate two-slot resources. Then, based on a determination that a first resource associated with the first slot is not in the second subset of candidate two-slot resources and a second resource associated with the second slot is in the second subset of candidate two-slot resources, the UE can continue execution of the process 1000 by excluding the second resource from the second subset of candidate two-slot resources.

In some implementations, the UE can continue execution of the process 1000 by determining that a first resource associated with the first slot is in the second subset of candidate two-slot resources and a second resource associated with the second slot is in the second subset of candidate two-slot resources. In such implementations, based on a determination that a first resource associated with the first slot is in the second subset of candidate two-slot resources and a second resource associated with the second slot is in the second subset of candidate two-slot resources, the UE can continue execution of the process 1000 by combining the first resource and the second resource in the second subset of candidate two-slot resources.

Residual PRBs in Contiguous RB-Based Transmission

In some implementations, the residual physical resource blocks (PRBs) belong to the last sub-channel. In such implementations, the residual PRBs may be used only for PSSCH transmissions. The residual PRBs are not counted in TBS calculation.

In some implementations, the residual PRBs are equally distributed to all the sub-channels in the same RB set. If a sub-channel has overlap with guard band, then the residual PRBs are not allocated to this sub-channel. For example, the residual PRBs are equally distributed to sub-channel 5, 6, 7, but not to sub-channel 4. In such implementations, the residual PRBs are not counted in TBS calculation, but only used for PSSCH transmissions.

In some implementations, the PSSCH rate matched bits are allocated in residual PRBs. In some implementations, the PSSCH repeated bits are allocated in residua PRBs.

Figure 13:
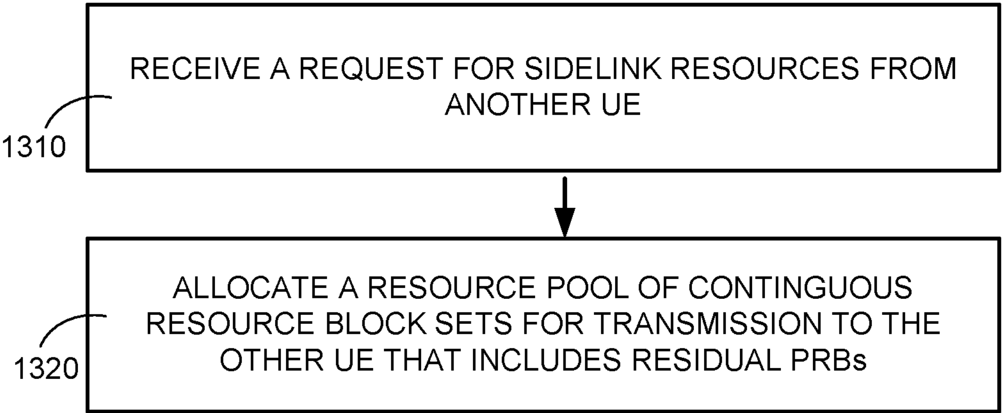
FIG. 13 illustrates a flowchart of an example of a process for allocating residual physical resource blocks (PRBs) in a resource pool.

FIG. 13 illustrates a flowchart of an example of a process 1300 for allocating residual physical resource blocks (PRBs) in a resource pool. For convenience, the process 1300 will be described as being performed by a UE such as, e.g., UE 105-1 of FIG. 1, UE 105-2 of FIG. 1, or UE 1400 of FIG. 14.

A UE can begin execution of the process 1300 by receiving a request for sidelink resources from another UE (1310).

The UE can continue execution of the process 1300 by allocating a resource pool of contiguous resource blocks for transmission to the other UE that includes the residual PRBs (1320). In some implementations, the residual PRBs are only used for PSSCH transmission. In some implementations, the residual PRBs include PSSCH rate matched bits. In some implementations, the residual PRBs include PSSCH repeated bits. In some implementations, the residual PRBs are not counted in TBS calculation.

In some implementations, allocating of a resource pool of contiguous resource blocks for transmission to the other UE that includes the residual PRBs at step 1320 can include the UE allocating the residual PRBs into a last sub-channel of the allocated resource pool.

In some implementations, allocating a resource pool of contiguous resource blocks for transmission to the other UE that includes the residual PRBs at stage 1320 can include the UE allocating the residual PRBs equally across each of the sub-channels in a same resource block set.

In some implementations, allocating a resource pool of contiguous resource blocks for transmission to the other UE that includes the residual PRBs can include determining whether a resource block has a sub-channel that overlaps with a guard band of the resource pool. Then, based on a determination that the resource block has a sub-channel that overlaps with a guard band of the resource pool, the UE can continue execution of the process 1300 by allocating the residual PRBs equally across each of sub-channel of the resource black that does not overlap with the guard band.

Power Control In Sidelink Operations In Unlicensed Spectrum

In some implementations, aspects of the present disclosure relate to S-SSB power control in SL operations in unlicensed spectrum. In conventional systems, S-SSB power control was dictated by TS38.213 using the following equation:

$$P_{S-SSB}(i)=\min\left(P_{CMAX},\, P_{O,S-SSB}+10\log_{10}\left(2^{\mu}\cdot M_{RB}^{S-SSB}+\alpha_{S-SSB}\cdot PL\right)\right),$$

where:

$P_{CMAX}$ is the maximum transmission of UE, $P_{O,S-SSB}$ is a value of d1–P0–PSBCH if provided; else $P_{S-SSB}(i)=P_{CMAX}$, $\alpha_{S-SSB}$ is a value of d1-Alpha-PSBCH if provided; else, $\alpha_{S-SSB}=1$ $$M_{RB}^{S\text{-}SSB}=11$$

is a number of resource blocks for S-SSB transmission with SCS=μ, and

PL is the downlink path loss.

In accordance with the present disclosure, a new power control equation for S-SSB power control is disclosed. This new power control equation for S-SSB is set forth below:

$$P_{S-SSB}(i)=\min\left(P_{CMAX},\, P_{O,S-SSB}+10\log_{10}\left(2^{\mu}\cdot M_{RB}^{S-SSB}+\alpha_{S-SSB}\cdot PL\right),\, P_{PSD}\cdot 10\log_{10}\left(2^{\mu}\cdot M_{RB}^{S-SSB}\cdot 0.18\right)\right),$$

where:

$P_{PSD}$ is the PSD limit (e.g., 10 dBm/MHz), and $P_{O,S-SSB}$ is a value of d1–P0–PSBCH if provided; else $$P_{S-SSB}(i)=\min\left(P_{CMAX},\, P_{PSD}\cdot 10\log_{10}\left(2^{\mu}\cdot M_{RB}^{S-SSB}\cdot 0.18\right)\right).$$

All other parameters of the new power control equation for S-SSB power control have the same meaning as their corresponding parameter in the legacy power control equation provided by TS38.213.

In some implementations, aspects of the present disclosure relate to PSFCH power control in sidelink operations in unlicensed spectrum. In conventional systems, PSFCH power control was dictated by TS38.213 using the following equation:

$$P_{PSFCH,one}=P_{O,PSFCH}+10\log_{10}\left(2^{\mu}\cdot M_{RB}^{PSFCH}\right)+\alpha_{PSFCH}\cdot PL)$$

where:

$$M_{RB}^{PSFCH}$$

is a number of resource blocks for PSFCH transmission with SCS=μ, $P_{0,PSFCH}$ is a value of dl-P0-PSFCH, $\alpha_{PSFCH}$ is a value of dl-Alpha-PSFCH if provided; else, $\alpha_{PSFCH}=1$, and PL is the downlink path loss.

If $N_{sch,Tx,PSFCH}\le N_{max,PSFCH}$:

If $P_{PSFCH,one}+10\log_{10}(N_{sch,Tx,PSFCH})\le P_{CMAX}$

Then, $N_{Tx,PSFCH}=N_{sch,Tx,PSFCH}$ and $P_{PSFCH,k}(i)=P_{PSFCH,one}$

Else, UE autonomously determines $N_{Tx,PSFCH}$ PSFCH transmissions based on priority, such that $P_{PSFCH,one}+10\log_{10}(N_{sch,Tx,PSFCH})\le P_{CMAX}$ and $P_{PSFCH,k}(i)=\min(P_{CMAX}-10\cdot\log_{10}(N_{Tx,PSFCH}),\, P_{PSFCH,one})$.

Else, UE autonomously selects $N_{max,PSFCH}$ PSFCH transmission according to priority.

In accordance with the present disclosure, a modification to the parameters for the legacy power control equation for PSFCH transmission is disclosed. In particular, the present disclosure discloses use of the following parameters in the PSFCH power control equation of TS38.213:

If $N_{sch,Tx,PSFCH,1MHz}\le N_{max,PSFCH,1MHz}$

If $$P_{PSFCH,one}-10\log_{10}\left(2^{\mu}\cdot M_{RB}^{PSFCH}\right)+10\log_{10}(N_{sch,Tx,PSFCH,1\ MHz})\le P_{PSD}$$

Then, $N_{Tx,PSFCH,1MHz}=N_{sch,Tx,PSFCH,1MHz}$ and $P_{PSFCH,k}(i)=P_{PSFCH,one}$ Else, UE autonomously determines $N_{Tx,PSFCH,1MHz}$ PSFCH transmissions in 1 MHz bandwidth based on priority, such that the new power control equation for PSFCH transmission in accordance with the present disclosure is set forth below:

$$P_{PSFCH,one}-10\log_{10}\left(2^{\mu}\cdot M_{RB}^{PSFCH}\right)+10\log_{10}(N_{Tx,PSFCH,1MHz})\le P_{PSD}\text{ and}$$

$$P_{PSFCH,k}(i)=\left(\min\left(P_{PSD}-10\cdot\log_{10}(N_{Tx,PSFCH,1MHz}),\, P_{PSFCH,one}-10\log_{10}\left(2^{\mu}\cdot M_{RB}^{PSFCH}\right)\right)\right)\cdot 10\log_{10}\left(2^{\mu}\cdot M_{RB}^{PSFCH}\right)$$

Else, UE autonomously selects $N_{max,\ PSFCH,1MHz}$ PSFCH transmission according to priority.

Like parameters from the legacy PSFCH transmission power control equation that have not been modified in the new power control equation for PSFCH transmission have the same meaning as the legacy PSFCH power control equation.

FIG. 14 illustrates an example UE 1400, according to some implementations. The UE 1400 may be similar to and substantially interchangeable with UEs X105 of FIG. 1.

The UE 1400 may be any mobile or non-mobile computing device, such as, for example, mobile phones, computers, tablets, industrial wireless sensors (for example, microphones, pressure sensors, thermometers, motion sensors, accelerometers, inventory sensors, electric voltage/current meters, etc.), video devices (for example, cameras, video cameras, etc.), wearable devices (for example, a smart watch), relaxed-IoT devices.

The UE 1400 may include processors 1402, RF interface circuitry 1404, memory/storage 1406, user interface 1408, sensors 1410, driver circuitry 1412, power management integrated circuit (PMIC) 1414, one or more antenna(s) 1416, and battery 1418. The components of the UE 1400 may be implemented as integrated circuits (ICs), portions thereof, discrete electronic devices, or other modules, logic, hardware, software, firmware, or a combination thereof. The block diagram of FIG. 14 is intended to show a high-level view of some of the components of the UE 1400. However, some of the components shown may be omitted, additional components may be present, and different arrangement of the components shown may occur in other implementations.

The components of the UE 1400 may be coupled with various other components over one or more interconnects 1420, which may represent any type of interface, input/output, bus (local, system, or expansion), transmission line, trace, optical connection, etc. that allows various circuit components (on common or different chips or chipsets) to interact with one another.

The processors 1402 may include processor circuitry such as, for example, baseband processor circuitry (BB) 1422A, central processor unit circuitry (CPU) 1422B, and graphics processor unit circuitry (GPU) 1422C. The processors 1402 may include any type of circuitry or processor circuitry that executes or otherwise operates computer-executable instructions, such as program code, software modules, or functional processes from memory/storage 1406 to cause the UE 1400 to perform operations as described herein.

In some implementations, the baseband processor circuitry 1422A may access a communication protocol stack 1424 in the memory/storage 1406 to communicate over a 3GPP compatible network. In general, the baseband processor circuitry 1422A may access the communication protocol stack to: perform user plane functions at a physical (PHY) layer, medium access control (MAC) layer, radio link control (RLC) layer, packet data convergence protocol (PDCP) layer, service data adaptation protocol (SDAP) layer, and PDU layer; and perform control plane functions at a PHY layer, MAC layer, RLC layer, PDCP layer, RRC layer, and a non-access stratum layer. In some implementations, the PHY layer operations may additionally/alternatively be performed by the components of the RF interface circuitry 1404. The baseband processor circuitry 1422A may generate or process baseband signals or waveforms that carry information in 3GPP-compatible networks. In some implementations, the waveforms for NR may be based cyclic prefix orthogonal frequency division multiplexing (OFDM) "CP-OFDM" in the uplink or downlink, and discrete Fourier transform spread OFDM "DFT-S-OFDM" in the uplink.

The memory/storage 1406 may include one or more non-transitory, computer-readable media that includes instructions (for example, communication protocol stack 1424) that may be executed by one or more of the processors 1402 to cause the UE 1400 to perform various operations described herein. The memory/storage 1406 include any type of volatile or non-volatile memory that may be distributed throughout the UE 1400. In some implementations, some of the memory/storage 1406 may be located on the processors 1402 themselves (for example, L1 and L2 cache), while other memory/storage 1406 is external to the processors 1402 but accessible thereto via a memory interface. The memory/storage 1406 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 1404 may include transceiver circuitry and radio frequency front module (RFEM) that allows the UE 1400 to communicate with other devices over a radio access network. The RF interface circuitry 1404 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna(s) 1416 and proceed to filter and amplify (with a low-noise amplifier) the signal. The signal may be provided to a receiver of the transceiver that downconverts the RF signal into a baseband signal that is provided to the baseband processor of the processors 1402.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna(s) 1416. In various implementations, the RF interface circuitry 1404 may be configured to transmit/receive signals in a manner compatible with NR access technologies.

The antenna(s) 1416 may include one or more antenna elements to convert electrical signals into radio waves to travel through the air and to convert received radio waves into electrical signals. The antenna elements may be arranged into one or more antenna panels. The antenna(s) 1416 may have antenna panels that are omnidirectional, directional, or a combination thereof to enable beamforming and multiple input, multiple output communications. The antenna(s) 1416 may include microstrip antennas, printed antennas fabricated on the surface of one or more printed circuit boards, patch antennas, phased array antennas, etc. The antenna(s) 1416 may have one or more panels designed for specific frequency bands including bands in FR1 or FR2.

The user interface 1408 includes various input/output (I/O) devices designed to enable user interaction with the UE 1400. The user interface 1408 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs), or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 1400.

The sensors 1410 may include devices, modules, or subsystems whose purpose is to detect events or changes in its environment and send the information (sensor data) about the detected events to some other device, module, subsystem, etc. Examples of such sensors include, inter alia, inertia measurement units including accelerometers, gyroscopes, or magnetometers; microelectromechanical systems or nanoelectromechanical systems including 3-axis accelerometers, 3-axis gyroscopes, or magnetometers; level sensors; temperature sensors (for example, thermistors); pressure sensors; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1412 may include software and hardware elements that operate to control particular devices that are embedded in the UE 1400, attached to the UE 1400, or otherwise communicatively coupled with the UE 1400. The driver circuitry 1412 may include individual drivers allowing other components to interact with or control various input/output (I/O) devices that may be present within, or connected to, the UE 1400. For example, driver circuitry 1412 may include a display driver to control and allow access to a display device, a touchscreen driver to control and allow access to a touchscreen interface, sensor drivers to obtain sensor readings of sensors 1410 and control and allow access to sensors 1410, drivers to obtain actuator positions of electro-mechanic components or control and allow access to the electro-mechanic components, a camera driver to control and allow access to an embedded image capture device, audio drivers to control and allow access to one or more audio devices.

The PMIC 1414 may manage power provided to various components of the UE 1400. In particular, with respect to the processors 1402, the PMIC 1414 may control power-source selection, voltage scaling, battery charging, or DC-to-DC conversion.

In some implementations, the PMIC 1414 may control, or otherwise be part of, various power saving mechanisms of the UE 1400. A battery 1418 may power the UE 1400, although in some examples the UE 1400 may be mounted deployed in a fixed location, and may have a power supply coupled to an electrical grid. The battery 1418 may be a lithium ion battery, a metal-air battery, such as a zinc-air battery, an aluminum-air battery, a lithium-air battery, and the like. In some implementations, such as in vehicle-based applications, the battery 1418 may be a typical lead-acid automotive battery.

Figure 15:
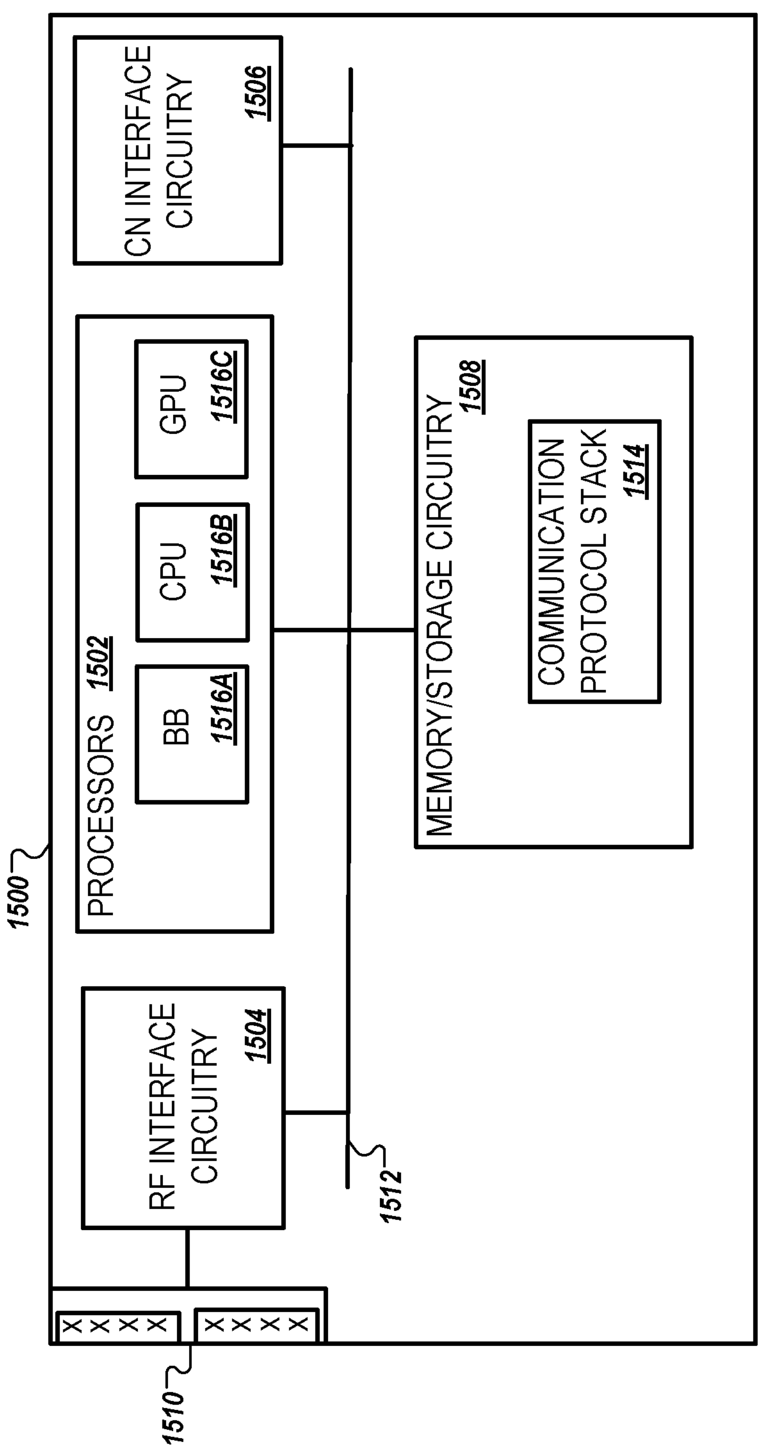
FIG. 15 illustrates an example access node, according to some implementations.

FIG. 15 illustrates an example access node 1500 (e.g., a base station or gNB), according to some implementations. The access node 1500 may be similar to and substantially interchangeable with base stations X110. The access node 1500 may include processors 1502, RF interface circuitry 1504, core network (CN) interface circuitry 1506, memory/storage circuitry 1508, and one or more antenna(s) 1510.

The components of the access node 1500 may be coupled with various other components over one or more interconnects 1512. The processors 1502, RF interface circuitry 1504, memory/storage circuitry 1508 (including communication protocol stack 1514), antenna(s) 1510, and interconnects 1512 may be similar to like-named elements shown and described with respect to FIG. 14. For example, the processors 1502 may include processor circuitry such as, for example, baseband processor circuitry (BB) 1516A, central processor unit circuitry (CPU) 1516B, and graphics processor unit circuitry (GPU) 1516C.

The CN interface circuitry 1506 may provide connectivity to a core network, for example, a 5th Generation Core network (5GC) using a 5GC-compatible network interface protocol such as carrier Ethernet protocols, or some other suitable protocol. Network connectivity may be provided to/from the access node 1500 via a fiber optic or wireless backhaul. The CN interface circuitry 1506 may include one or more dedicated processors or FPGAs to communicate using one or more of the aforementioned protocols. In some implementations, the CN interface circuitry 1506 may include multiple controllers to provide connectivity to other networks using the same or different protocols.

As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can include ground stations (e.g., terrestrial access points) or satellite stations providing coverage within a geographic area (e.g., a cell). As used herein, the term "NG RAN node" or the like may refer to an access node 1500 that operates in an NR or 5G system (for example, a gNB), and the term "E-UTRAN node" or the like may refer to an access node 1500 that operates in an LTE or 4G system (e.g., an eNB). According to various implementations, the access node 1500 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some implementations, all or parts of the access node 1500 may be implemented as one or more software entities running on server computers as part of a virtual network, which may be referred to as a CRAN and/or a virtual baseband unit pool (vBBUP). In V2X scenarios, the access node 1500 may be or act as a "Road Side Unit." The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like.

In the following sections, further exemplary embodiments are provided.

Example 1 are one or more processors comprising circuitry to execute one or more instructions that, when executed, cause the user equipment (UE) to perform operations for resource allocation for contiguous resource block transmission, the operations comprising identifying a set of sub-channels that are not suitable for serving as leading sub-channels for Physical Sidelink Control Channel (PSCCH) and Physical Sidelink Shared Channel (PSSCH) transmission; excluding the identified set of sub-channels from a candidate set of resources, and sending PSCCH or PSSCH using a set of sub-channels excluding the set of sub-channels that are not suitable.

Example 2 may include the subject matter of example 1, wherein identifying a set of sub-channels that are not suitable for serving as leading sub-channels for PSCCH/PSSCH transmission comprises identifying a set of sub-channels that each have an overlap with a guard band.

Example 3 may include the subject matter of any of examples 1-2, wherein identifying a set of sub-channels that are not suitable for serving as leading sub-channels for PSCCH/PSSCH transmission comprises identifying a set of sub-channels that each have a predetermined number of first resource blocks that overlap with a guard band.

Example 4 may include the subject matter of any of examples 1-3, wherein excluding the identified set of sub-channels from a candidate set of resources comprises excluding the candidate set of resources is an initial candidate set of resources.

Example 5 may include the subject matter of any of examples 1-4, wherein excluding the identified set of sub-channels from a candidate set of resources comprises excluding the sub-channels from a total number of candidate resources MTOTAL.

Example 6 may include the subject matter of any of examples 1-5, wherein excluding the identified set of sub-channels from a candidate set of resources comprises excluding the identified set of sub-channels from a subsequent candidate set of resources that is evaluated for resource exclusion after an initial candidate set of resources is evaluated for resource exclusion.

Example 7 may include the subject matter of any of examples 1-6, wherein excluding the identified set of sub-channels from a candidate set of resources comprises excluding the identified set of sub-channels after determining a resource selection window.

Example 8 may include the subject matter of any of examples 1-7, wherein excluding the identified set of sub-channels from a candidate set of resources comprises excluding the identified set of sub-channels after determining a resource selection window and before excluding candidate resources if the candidate resources are reserved by other UEs.

Example 9 may include the subject matter of any of examples 1-8, wherein excluding the identified set of sub-channels from a candidate set of resources comprises excluding the identified set of sub-channels after excluding candidate resources if the candidate resources are reserved by other UEs.

Example 10 may include the subject matter of any of examples 1-9, comprising determining whether a number of resources in an initial candidate set SA is based on X times a total number or resource (MTOTAL), wherein SA already excludes the identified set of sub-channels.

Example 11 may include the subject matter of example 10, wherein X is separately (pre) configured for the operations of the contiguous resource block transmission in sidelink on unlicensed spectrum (SL-U).

Example 12 may include the subject matter of any of examples 1-11, comprising determining whether a number of resources in an initial candidate set SA is based on X times a total number or resource (MTOTAL), wherein SA does not exclude the identified set of sub-channels.

Example 13 may include the subject matter of example 12, wherein X is separately (pre) configured for the operations of the contiguous resource block transmission in sidelink on unlicensed spectrum (SL-U).

Example 14 may include the subject matter of example 13, wherein X is less than 0.20.

Example 15 are one or more processors comprising circuitry to execute one or more instructions that, when executed, cause the user equipment (UE) to perform operations for resource allocation for interlaced resource block transmission, the operations comprising receiving a request for sidelink resources from another UE; allocating a candidate single-slot resource for transmission, wherein the allocated candidate single-slot resource is defined as a set of correlated sub-channels in a particular logic slot, and indicating the candidate single-slot resource to the second UE.

Example 16 may include the subject matter of example 15, wherein the allocated single-slot resource comprises contiguous sub-channels in a same resource block set.

Example 17 may include the subject matter of any of examples 15-16, wherein the allocated single-slot resource comprises a sub-channel with same index over contiguous resource block sets.

Example 18 may include the subject matter of any of examples 15-17, wherein the allocated single-slot resource comprises a contiguous sub-channels with same indices over contiguous resource block sets.

Example 19 are one or more processors comprising circuitry to execute one or more instructions that, when executed, cause the user equipment (UE) to perform operations for Physical Sidelink Feedback Channel (PSFCH) transmission occasion indications, the operations comprising obtaining resource pool (pre) configuration data indicating that (i) dynamic PSFCH occasion indication is supported or (ii) dynamic PSFCH occasion indication is not supported; and transmitting PSFCH transmission occasion indications based on the obtained resource pool (pre) configuration data.

Example 20 may include the subject matter of example 19, wherein the obtained resource pool (pre) configuration data indicates that (i) dynamic PSFCH occasion indication is supported; and wherein transmitting PSFCH transmission occasion indications based on the obtained resource pool (pre) configuration data comprises transmitting SCI of a PSCCH/PSSCH transmission, wherein the SCI of the PSCCH/PSSCH transmission indicates the PSFCH transmission occasions that are to be applied.

Example 21 may include the subject matter of any of examples 19-20, wherein the one or more SCI of the PSCCH/PSSCH transmission are SCI stage 1 of the PSCCH/PSSCH transmission.

Example 22 may include the subject matter of any of examples 19-21, wherein the one or more SCI of the PSCCH/PSSCH transmission are SCI stage 2 of the PSCCH/PSSCH transmission.

Example 23 may include the subject matter of any of examples 19, wherein the obtained resource pool (pre) configuration data indicates that (i) dynamic PSFCH occasion indication is supported; and wherein transmitting PSFCH transmission occasion indications based on the obtained resource pool (pre) configuration data comprises transmitting a number of bits indicating which PSFCH transmission occasions are to be applied.

Example 24 may include the subject matter of example 23, wherein transmitting a number of bits indicating which PSFCH transmission occasions are to be applied comprises transmitting a bitmap having a number of bits that indicate which PSFCH transmission occasion that are to be applied, wherein each bit of the bitmap corresponds to a particular PSFCH transmission occasion, with the number of bits of the bitmap corresponds to a number of (pre) configured PSFCH transmission occasions.

Example 25 may include the subject matter of example 24, wherein each bit of the bitmap is a 1 or a 0, with a 1 indicating that the corresponding PSFCH transmission occasion is to be applied and a 0 indicating that the corresponding PSFCH transmission occasion is not to be applied.

Example 26 may include the subject matter of example 24, wherein the bitmap is transmitted using SCI stage 1 of PSCCH/PSSCH transmission.

Example 27 may include the subject matter of example 24, wherein the bitmap is transmitted using SCI stage 2 of PSCCH/PSSCH transmission.

Example 28 may include the subject matter of example 23, wherein transmitting a number of bits indicating which PSFCH transmission occasions are to be applied comprises transmitting a $\lceil \log_2 X \rceil$ bits to indicate the earliest PSFCH transmission occasions that are to be applied, where X is a (pre) configured number of PSFCH transmission occasions.

Example 29 may include the subject matter of example 28, wherein each of the PSFCH transmission occasions after the earliest indicated PSFCH transmission are autonomously applied.

Example 30 may include the subject matter of example 28, wherein the transmitted bits are transmitted using SCI stage 1 of PSCCH/PSSCH transmission.

Example 31 may include the subject matter of example 28, wherein the transmitted bits are transmitted using SCI stage 2 of PSCCH/PSSCH transmission.

Example 32 are one or more processors comprising circuitry to execute one or more instructions that, when executed, cause the user equipment (UE) to perform operations for resource allocation for co-existence with LTE sidelink, the operations comprising determining a resource selection window that identifies an initial set of candidate two-slot resources, the resource selection window starting at a first slot (t'y) and ending at another slot (t'y+1); determining a first subset of candidate two-slot resources in the resource selection window by excluding, from the initial set of candidate two-slot resources, candidate two-slot resources over all sub-channels from the initial set if the UE has not monitored at least one of the two slots; extending the unmonitored slot to either t'y or t'y+1 for any permissible periodicity value and a hypothetical SCI set; and determining a second subset of candidate two-slot resources by excluding, from the first subset of candidate two-slot resources any single-slot resources that have been reserved by another UE; and reporting the second subset of candidate two-slot resources to a higher layer.

Example 33 may include the subject matter of example 32, wherein determining a resource selection window that identifies an initial set of candidate two-slot resources, the resource selection window starting at a first slot (t'y) and ending at another slot (t'y+1) occurs when determining a resource selection window with a total number of candidate resources MTOTAL.

Example 34 may include the subject matter of any of examples 32-33, wherein excluding, from the initial set of candidate two-slot resources, candidate two-slot resources over all sub-channels from the initial set if the UE has not monitored at least one of the two slots occurs.

Example 35 may include the subject matter of any of examples 32-34, wherein excluding, from the initial set of candidate two-slot resources any single-slot resources that have been reserved by another UE.

Example 36 may include the subject matter of any of examples 32-35, wherein determining a resource selection window that identifies an initial set of candidate two-slot resources, the resource selection window starting at a first slot (t'y) and ending at another slot (t'y+1) comprises determining whether the first slot (t'y) of the resource selection window is not aligned with the starting position of a subframe in LTE sidelink; and based on a determination that the first slot (t'y) is not aligned with the starting position of the a subframe in LTE sidelink, delaying the resource selection window to align with a starting position of a subframe in LTE sidelink.

Example 37 may include the subject matter of any of examples 32-36, wherein determining a resource selection window that identifies an initial set of candidate two-slot resources, the resource selection window starting at a first slot (t'y) and ending at another slot (t'y+1) comprises determining whether the last slot (t'y+1) of the resource selection window is not aligned with an ending position of a subframe in LTE sidelink; and based on a determination that the last slot (t'y+1) of the resource selection window is not aligned with an ending position of a subframe in LTE sidelink, prolonging or shortening the resource selection window to an ending position of a subframe in LTE sidelink.

Example 38 may include the subject matter of any of examples 32-37, wherein the slots are logic slots or physical slots.

Example 39 may include the subject matter of any of examples 32-36, the operations further comprising identifying a set of slots (Ex) that are not aligned with a starting of a subframe in LTE sidelink; and excluding the identified set of slots (Ex) from the initial set of candidate resources.

Example 40 may include the subject matter of any of examples 32-39, the operations further comprising determining that another LTE UE has reserved an LTE sidelink resource in a subframe in LTE sidelink; and based on the determination that the other LTE UE has reserved an LTE sidelink resource in a subframe in LTE sidelink, exclude, from the second subset of candidate two-slot resources, each of the single-slot resources that are time overlapping a second half of the subframe.

Example 41 may include the subject matter of any of examples 32-40, the operations further comprising determining that another LTE UE reserves an LTE sidelink resource in a subframe that time overlaps with a first slot and a second slot.

Example 42 may include the subject matter of example 41, the operations further comprising determining that a first resource associated with the first slot is in the second subset of candidate two-slot resources and a second resource associated with the second slot is not in the second subset of candidate two-slot resources; and based on a determination that a first resource associated with the first slot is in the second subset of candidate two-slot resources and a second resource associated with the second slot is not in the second subset of candidate two-slot resources, excluding the first resource from the second subset of candidate two-slot resources.

Example 43 may include the subject matter of example 41, the operations further comprising determining that a first resource associated with the first slot is not in the second subset of candidate two-slot resources and a second resource associated with the second slot is in the second subset of candidate two-slot resources; and based on a determination that a first resource associated with the first slot is not in the second subset of candidate two-slot resources and a second resource associated with the second slot is in the second subset of candidate two-slot resources, excluding the second resource from the second subset of candidate two-slot resources.

Example 44 may include the subject matter of any of examples 41-43, the operations further comprising determining that a first resource associated with the first slot is in the second subset of candidate two-slot resources and a second resource associated with the second slot is in the second subset of candidate two-slot resources, and based on a determination that a first resource associated with the first slot is in the second subset of candidate two-slot resources and a second resource associated with the second slot is in the second subset of candidate two-slot resources, combining the first resource and the second resource in the second subset of candidate two-slot resources.

Example 45 are one or more processors comprising circuitry to execute one or more instructions that, when executed, cause the user equipment (UE) to perform operations for allocating residual physical resource blocks (PRBs) in a resource pool, the operations comprising receiving a request for sidelink resources from another UE; allocating a resource pool of contiguous resource blocks for transmission to the other UE that includes the residual PRBs, and indicating the candidate single-slot resource to the second UE.

Example 46 may include the subject matter of example 45, wherein the residual PRBs are only used for PSSCH transmission.

Example 47 may include the subject matter of example 46, wherein the residual PRBs include PSSCH rate matched bits.

Example 48 may include the subject matter of example 46, wherein the residual PRBs include PSSCH repeated bits.

Example 49 may include the subject matter of any of examples 45-48, wherein the residual PRBs are not counted in TBS calculation.

Example 50 may include the subject matter of example 45-49, wherein allocating a resource pool of contiguous resource blocks for transmission to the other UE that includes the residual PRBs comprises allocating the residual PRBs into a last sub-channel of the allocated resource pool.

Example 51 may include the subject matter of any of examples 45-50, wherein allocating a resource pool of contiguous resource blocks for transmission to the other UE that includes the residual PRBs comprises allocating the residual PRBs equally across each of the sub-channels in a same resource block set.

Example 52 may include the subject matter of any of examples 45-51, wherein allocating a resource pool of contiguous resource blocks for transmission to the other UE that includes the residual PRBs comprises determining whether a resource block has a sub-channel that overlaps with a guard band of the resource pool; and based on a determination that the resource block has a sub-channel that overlaps with a guard band of the resource pool, allocating the residual PRBs equally across each of sub-channel of the resource black that does not overlap with the guard band.

Example 53 may include one or more non-transitory computer-readable media including instructions to cause an electronic device, upon execution of the instructions by one or more processors of the electronic device, to perform one or more elements of a method described in or related to any of examples 1-52, or any other method or process described herein.

Example 54 may include an apparatus including logic, modules, or circuitry to perform one or more elements of a method described in or related to any of examples 1-52, or any other method or process described herein.

Example 55 may include a method, technique, or process as described in or related to any of examples 1-52, or portions or parts thereof.

Example 56 may include an apparatus including: one or more processors and one or more computer-readable media including instructions that, when executed by the one or more processors, cause the one or more processors to perform the method, techniques, or process as described in or related to any of examples 1-52, or portions thereof.

A system, e.g., a base station, an apparatus including one or more baseband processors, and so forth, can be configured to perform particular operations or actions by virtue of having software, firmware, hardware, or a combination of them installed on the system that in operation causes or cause the system to perform the actions. The operations or actions performed either by the system can include the methods of any one of examples 1-52.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112 (f) interpretation for that component.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

As described above, one aspect of the present technology may relate to the gathering and use of data available from specific and legitimate sources to allow for interaction with a second device for a data transfer. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to provide for secure data transfers occurring between a first device and a second device. The personal information data may further be utilized for identifying an account associated with the user from a service provider for completing a data transfer.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. For example, a user may "opt in" or "opt out" of having information associated with an account of the user stored on a user device and/or shared by the user device. In addition to providing "opt in" and "opt out" options, the present disclosure contemplates providing notifications relating to the access or use of personal information. For instance, a user may be notified upon downloading an application that their personal information data will be accessed and then reminded again just before personal information data is accessed by the application. In some instances, the user may be notified upon initiation of a data transfer of the device accessing information associated with the account of the user and/or the sharing of information associated with the account of the user with another device.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

The invention claimed is:

1. One or more processors configured to:

receive control signaling that configures a contiguous resource block (RB) sidelink transmission structure for physical sidelink control channel (PSCCH) transmissions and physical sidelink shared channel (PSSCH) transmissions;

exclude one or more first sidelink resources from a candidate set of resources based at least on the contiguous RB sidelink transmission structure configured by the control signaling, the one or more first sidelink resources comprising a candidate two-slot resource with a leading sub-channel that overlaps with an intra-cell guard band, the candidate two-slot resource comprising a plurality of contiguous sub-channels starting from the leading sub-channel in two consecutive physical slots, wherein at least one sub-channel of the plurality of contiguous sub-channels does not overlap with the intra-cell guard band; and instruct radio frequency (RF) circuitry to transmit a PSCCH transmission or a PSSCH transmission using one or more second sidelink resources that are not excluded from the candidate set of resources.

2. The one or more processors of claim 1, wherein excluding the one or more first sidelink resources comprises determining that the one or more first sidelink resources each have an overlap with a guard band.

3. The one or more processors of claim 1, wherein excluding the one or more first sidelink resources comprises determining that the one or more first sidelink resources each include RBs that overlap with the intra-cell guard band in a sidelink resource pool.

4. The one or more processors of claim 1, wherein excluding the one or more first sidelink resources comprises excluding the one or more first sidelink resources from an initial candidate set of resources.

5. The one or more processors of claim 1, wherein excluding the one or more first sidelink resources from the candidate set of resources comprises excluding the one or more first sidelink resources from a total number of candidate resources MTOTAL.

6. The one or more processors of claim 1, wherein excluding the one or more first sidelink resources from the candidate set of resources comprises excluding the one or more first sidelink resources from a subsequent candidate set of resources that is evaluated for resource exclusion after an initial candidate set of resources is evaluated for resource exclusion.

7. The one or more processors of claim 1, wherein excluding the one or more first sidelink resources from the candidate set of resources comprises excluding the one or more first sidelink resources after determining a resource selection window.

8. The one or more processors of claim 1, wherein excluding the one or more first sidelink resources from the candidate set of resources comprises excluding the one or more first sidelink resources after determining a resource selection window and before excluding candidate resources reserved by other UEs.

9. The one or more processors of claim 1, wherein excluding the one or more first sidelink resources from the candidate set of resources comprises excluding the one or more first sidelink resources after excluding candidate resources reserved by other UEs.

10. The one or more processors of claim 1, wherein the one or more processors are further configured to determine whether a number of resources in an initial candidate set SA is based on X times a total number of resources MTOTAL.

11. The one or more processors of claim 10, wherein X is separately configured for contiguous RB transmission in a sidelink unlicensed spectrum (SL-U).

12. The one or more processors of claim 1, wherein the one or more processors are further configured to determine whether a number of resources in an initial candidate set SA is based on X times a total number or resource MTOTAL, wherein SA does not exclude the one or more first sidelink resources.

13. The one or more processors of claim 12, wherein X is separately configured for contiguous RB transmission in a sidelink unlicensed spectrum (SL-U).

14. The one or more processors of claim 13, wherein X is less than 0.20.

15. The one or more processors of claim 1, wherein excluding the one or more first sidelink resources comprises excluding one or more candidate single-slot or candidate multi-slot resources with a smallest sub-channel index that includes RBs of intra-cell guardband physical resource blocks (PRBs).

16. The one or more processors of claim 15, wherein the intra-cell guardband PRBs are configured by a higher layer parameter or determined according to a nominal intra-cell guard band and RB set pattern.

17. The one or more processors of claim 15, wherein a candidate single-slot resource is defined as a set of contiguous sub-channels starting from a sub-channel in a slot in one or more contiguous RB sets starting from a first RB set.

18. The one or more processors of claim 15, wherein a candidate multi-slot resource is defined as a set of contiguous sub-channels starting from a sub-channel in two or more consecutive slots starting from a slot in one or more contiguous RB sets starting from a first RB set.

19. A method comprising:

receiving control signaling that configures a contiguous resource block (RB) sidelink transmission structure for physical sidelink control channel (PSCCH) transmissions and physical sidelink shared channel (PSSCH) transmissions;

excluding one or more first sidelink resources from a candidate set of resources based at least on the contiguous RB sidelink transmission structure configured by the control signaling, the one or more first sidelink resources comprising a candidate two-slot resource with a leading sub-channel that overlaps with an intra-cell guard band, the candidate two-slot resource comprising a plurality of contiguous sub-channels starting from the leading sub-channel in two consecutive physical slots, wherein at least one sub-channel of the plurality of contiguous sub-channels does not overlap with the intra-cell guard band; and transmitting a PSCCH transmission or a PSSCH transmission using one or more second sidelink resources that are not excluded from the candidate set of resources.

20. A user equipment (UE) comprising:

one or more processors; and memory storing instructions that, when executed by the one or more processors, cause the UE to perform operations comprising:

receiving control signaling that configures a contiguous resource block (RB) sidelink transmission structure for physical sidelink control channel (PSCCH) transmissions and physical sidelink shared channel (PSSCH) transmissions;

excluding one or more first sidelink resources from a candidate set of resources based at least on the contiguous RB sidelink transmission structure configured by the control signaling, the one or more first sidelink resources comprising a candidate two-slot resource with a leading sub-channel that overlaps with an intra-cell guard band, the candidate two-slot resource comprising a plurality of contiguous sub-channels starting from the leading sub-channel in two consecutive physical slots, wherein at least one sub-channel of the plurality of contiguous sub-channels does not overlap with the intra-cell guard band; and transmitting a PSCCH transmission or a PSSCH transmission using one or more second sidelink resources that are not excluded from the candidate set of resources.

* * * * *